(12) United States Patent
Wu et al.

(10) Patent No.: US 11,560,515 B2
(45) Date of Patent: Jan. 24, 2023

(54) LUTETIUM BASED OXYORTHOSILICATE SCINTILLATORS CODOPED WITH TRANSITION METALS

(71) Applicant: University of Tennessee Research Foundation, Knoxville, TN (US)

(72) Inventors: Yuntao Wu, Knoxville, TN (US); Merry A. Koschan, Knoxville, TN (US); Charles L. Melcher, Oak Ridge, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 16/839,835

(22) Filed: Apr. 3, 2020

(65) Prior Publication Data

US 2020/0318006 A1    Oct. 8, 2020

Related U.S. Application Data

(60) Provisional application No. 62/830,081, filed on Apr. 5, 2019.

(51) Int. Cl.
  *C09K 11/77* (2006.01)
  *G01T 1/202* (2006.01)

(52) U.S. Cl.
  CPC .... *C09K 11/7774* (2013.01); *C09K 11/77742* (2021.01); *G01T 1/2023* (2013.01)

(58) Field of Classification Search
  CPC .................. C09K 11/77742; G01T 1/2023
  See application file for complete search history.

(56) References Cited

U.S. PATENT DOCUMENTS

| | | | |
|---|---|---|---|
| 6,278,832 B1 | 8/2001 | Zagumennyi et al. | |
| 7,651,632 B2 | 1/2010 | Ferrand et al. | |
| 8,617,422 B2 * | 12/2013 | Koschan | ............... C30B 15/00 |
| | | | 252/301.4 F |

(Continued)

FOREIGN PATENT DOCUMENTS

| | | | |
|---|---|---|---|
| WO | WO 2013/152434 | * | 10/2013 |
| WO | WO2013/152434 | | 10/2013 |

OTHER PUBLICATIONS

Melcher and Schweitzer, "Cerium-doped Lutetium Oxyorthosilicate: A Fast, Efficient New Scintillator" IEEE Trans. Nucl. Sei. 1992, 39(4), pp. 502-505.*

(Continued)

*Primary Examiner* — C Melissa Koslow
(74) *Attorney, Agent, or Firm* — Jenkins, Wilson, Taylor & Hunt, P.A.

(57) ABSTRACT

Codoped lutetium-based oxyorthosilicate scintillators (e.g., lutetium oxyorthosilicase (LSO) and lutetium-ytrrium oxyorthosilicate (LYSO) scintillators) codoped with transition metal ions (e.g., $Cu^{2+}$) are described. The codoping can alter one or more optical and/or scintillation property of the scintillator material. For example, the codoping can increase scintillation light yield and/or decrease scintillation decay time. Radiation detectors comprising the scintillators, methods of detecting high energy radiation using the radiation detectors, and methods of altering one or more scintillation and/or optical properties of a lutetium-based oxyorthosilicate scintillator are also described.

7 Claims, 15 Drawing Sheets

(14 of 15 Drawing Sheet(s) Filed in Color)

(56) References Cited

U.S. PATENT DOCUMENTS

| | | | |
|---|---|---|---|
| 9,175,420 B2* | 11/2015 | Andreaco | C30B 15/00 |
| 9,328,288 B2* | 5/2016 | Cohen | C09K 11/7774 |
| 9,624,429 B2 | 4/2017 | Stand et al. | |
| 9,695,356 B1 | 7/2017 | Stand et al. | |
| 10,221,355 B2 | 3/2019 | Stand et al. | |
| 10,591,617 B2 | 3/2020 | Wu et al. | |
| 2010/0327227 A1* | 12/2010 | Kurata | C30B 33/02 |
| | | | 252/301.4 F |
| 2012/0145963 A1 | 6/2012 | Andreaco et al. | |
| 2014/0061537 A1 | 3/2014 | Zagumennyi et al. | |
| 2014/0291580 A1 | 10/2014 | Zagumennyi et al. | |
| 2015/0353822 A1 | 12/2015 | Tyagi et al. | |
| 2016/0124094 A1 | 5/2016 | Melcher et al. | |
| 2016/0168458 A1 | 6/2016 | Stand et al. | |
| 2017/0190969 A1 | 7/2017 | Stand et al. | |
| 2018/0105745 A1 | 4/2018 | Stand et al. | |
| 2018/0155620 A1 | 6/2018 | Stand et al. | |
| 2018/0321393 A1 | 11/2018 | Wu et al. | |
| 2019/0250286 A1 | 8/2019 | Wu et al. | |
| 2020/0362238 A1 | 11/2020 | Foster et al. | |
| 2021/0253952 A1 | 8/2021 | Rutstrom et al. | |
| 2021/0270980 A1 | 9/2021 | Zhuravleva et al. | |

OTHER PUBLICATIONS

Alekhin, M. S.; Hass, J. T. M. de; Khodyuk, I. V.; Krämer, K. W.; Menge, P. R.; Ouspenski, V.; and Dorenbos, P. Improvement of γ-ray energy resolution of LaBr3:Ce3+ scintillation detectors by Sr2+ and Ca2+ co-doping, Appl. Phys. Lett. 2013, 102, 161915 1-4.

Burton, J. A.; Kolb, E. D.; Slichter, W. P.; and Struthers, J. D. Distribution of solute in crystals grown from the melt. Part II. Experimental, J. Chem. Phys. 1953, 21, 1991-1996.

Burton, J. A.; Prim, R. C.; and Slichter, W. P. The distribution of solute in crystals grown from the melt. Part I. Theoretical, J. Chem. Phys. 1953, 21, 1987-1991.

Chewpraditkul et al., "Comparison of absorption, luminescence and scintillation characteristics in Lu1.95Y0.05SiO5:Ce,Ca and Y2SiO5:Ce scintillators." Opt. Mater. 2013, 35, 1679-1684.

Cooke et al., "Electron-lattice coupling parameters and oscillator strengths of cerium-doped lutetium oxyorthosilicate." Phys. Rev. B 2000, 61, 11973.

Ding et al., "Influence of yttrium content on the location of rare earth ions in LYSO:Ce crystals." J. Solid State Chem. 2014, 209, 56-62.

Feng et al., "Temperature dependence of luminescence characteristics of Lu2(1-x)Y2xSiO5:Ce3+ scintillator grown by the Czochralski method." J. Appl. Phys. 2010, 108, 033519 1-6.

Foster, C.; Wu, Y.; Koschan, M.; and Melcher, C. L., Improvements in light yield and energy resolution by Li+ codoping (Lu0.75Y0.25)3Al5O12:Pr3+ single crystal scintillators, Phys. Status Solid i RRL 2018, 12, 1800280 1-4.

Jary et al., "Influence of yttrium content on the CeLu1 and CeLu2 luminescence characteristics in (Lu1-xYx)2SiO5:Ce single crystals." Opt. Mater. 2011, 34, 428-432.

Jia et al., "Effect of Li doping on the O vacancies in Lu2SiO5:Ce phosphors." Matt. Lett., 2018, 228, 372-374.

Kamada, K.; Nikl, M.; Kurosawa, S.; Beitlerova, A.; Nagura, A.; Shoji, Y.; Pejchal, J.; Ohashi, Y.; Yokota, Y.; and Yoshikawa, A. Alkali earth co-doping effects on luminescence and scintillation properties of Ce doped Gd3Al2Ga3O12 scintillator, Opt. Mater. 2015, 41, 63-66.

Kochurikhin et al., "Investigation of spiral bending of straight Czochralski grown dysprosium gallium aluminium garnet crystals." J. Crystal Growth 1996, 160, 181-183.

Kochurikhin, V. V.; Shimamura, K.; Fukuda, T. The influence of dopants on the interface stability during Dy3Ga5O12 single crystal growth, J. Crystal Growth 1994, 143, 232-236.

Kolk et al., "Temperature dependent spectroscopic studies of the electron delocalization dynamics of excited Ce ions in the wide band gap insulator, Lu2SiO5." Appl. Phys. Lett. 2003, 83, 1740-1742.

Liu, S.; Mares, J.; Feng, X.; Vedda, A.; Fasoli, M.; Shi, Y.; Kou, H.; Beitlerova, A.; Wu, L.; D'Ambrosio, C.; Pan, Y.; and Nikl, M. Toward bright and fast Lu3Al5O12:Ce,Mg optical ceramics scintillators, Adv. Opt. Mater. 2016, 4, 731-739.

Melcher et al., "Advances in the scintillation performance of LSO:Ce single crystals." IEEE Trans. Nucl. Sci. 2003, 50(4), 762-766.

Melcher, C. L.; Koschan, M.; Zhuravleva, M.; Wu. Y.; Rothfuss, H.; Meng, F.; Tyagi, M.; Donnald, S.; Yang, K.; Hayward, J. P.; and Eriksson, L. Scintillator design via codoping, JPS Conf. Proc. 2016, 11, 020001 1-8.

Ning et al., "Electronic properties and 4f →5d transitions in Ce-doped Lu2SiO5: a theoretical investigation." J. Mater. Chem. 2012, 22 13723-13731.

Shannon, "Revised effective ionic radii and systematic studies of interatomic distances in halides and chalcogenides." Acta Cryst. 1976, A32, 751-767.

Shimura, N.; Kamada, M.; Gunji, A.; Yamana, S.; Usui, T.; Kurashige, K.; Ishibashi, H.; Senguttuvan, N.; Shimizu, S.; Sumiya, K.; and Murayama, H.; Zr doped GSO:Ce single crytals and their scintillation performance, IEEE Trans. Nucl. Sci. 2006, 53, 2519-2522.

Uecker, R.; Wilke, H.; Schlom, D. G.; Velickov, B.; Reiche, P.; Polity, A.; Bernhagen, M.; and Rossberg, M. Spiral formation during Czochralski growth of rare-earth scandates, J. Cryst. Growth 2006, 295, 84-91.

Vedda et al., "Thermally stimulated tunneling in rare-earth-doped oxyorthosilicates." Phys. Rev. B 2008, 78, 195123 1-8.

Vedda et al., "Trap-center recombination processes by rare earth activators in YAlO3 single crystal host." Phys. Rev. B 2009, 80, 045113 1-9.

Wu et al., "Czochralski crystal growth, optical, scintillation, and defect properties of Cu2+ codoped Lu2SiO5:Ce3+ single crystals," Cryst. Growth Des, 19, 7, 4081-4089 (2019).

Wu et al., "On the Role of Li+ Codoping in Simultaneous Improvement of Light Yield, Decay Time, and Afterglow of Lu2SiO5:Ce3+ Scintillation Detectors." Phys. Status Solid i RRL 2019, 13, 1800472 1-5.

Wu et al., "Revealing the role of calcium codoping on optical and scintillation homogeneity in Lu2SiO5:Ce single crystals." J. Cryst. Growth 2018, 498, 362-371.

Wu et al., "Unraveling the Critical Role of Site Occupancy of Lithium Codopants in Lu2SiO5:Ce3+ Single-Crystalline Scintillators." ACS Appl. Mater. Interface 2019, 11, 8194-8201.

Wu, Y.; Li, Q.; Rutstrom, D. J.; Greeley, I.; Stand, L.; Loyd, M.; Koschan, M.; and Melcher, C. L., Effects of zirconium codoping on the optical and scintillation properties of SrI2:Eu2+ single crystals, Nucl. Instrum. Methods Phys. Res., Sect. A DOI:10.1016/j.nima.2018.09.077.

Wu, Y.; Li, Q.; Rutstrom, D. J.; Zhuravleva, M.; Loyd, M.; Stand, L.; Koschan, M.; and Melcher, C. L. Tailoring the properties of europium-doped potassium calcium iodide scintillators through defect engineering, Phys. Status Solid i RRL 2018, 12, 1700403 1-4.

Yang et al., "Effects of Calcium Codoping on Charge Traps in LSO:Ce Crystals." IEEE Trans. Nucl. Sci. 2009, 56(5), 2960-2965.

Blahuta et al., Evidence and Consequences of $Ce^{4+}$ in LYSO: Ce,Ca and LYSO:Ce,Mg Single Crystals for Medical Imaging Applications, IEEE Trans. Nucl. Sci. 2013, 60(4), 3134-3141.

Feng et al., Annealing effects on Czochralski grown $Lu_2Si_{i2}O_7$:$Ce^{3+}$ crystals under different atmospheres, Appl. Phys. 2008, 103, 083109 1-7.

Liu et al., "Effect of $Mg^{2+}$ co-doping on the scintillation performance of LuAG:Ce ceramics", Phys. Status Solidi RRL, 2014, 8(1), 105-109.

Melcher and Schweitzer, "Cerium-doped Lutetium Oxyorthosilicate: A Fast, Efficient New Scintillator", IEEE Trans. Nucl. Sci. 1992, 39(4), 502-505.

Melcher et al., "Cerium Oxication State in LSO:Ce Scintillators", IEEE Trans. Nucl. Sci. 2005, 52(5), 1809-1812.

Moszynski et al., "Absolute Light Output of Scintillators", IEEE Trans. Nucl. Sci. 1997, 44(3), 1052-1061.

Nikl et al., "Defect Engineering in Ce-Doped Aluminum Garnet Single Crystal Scintillators", Cryst. Growth Des. 2014, 14, 4827-4833.

(56) References Cited

OTHER PUBLICATIONS

Spurrier et al., "Effects of Co-Doping on the Scintillation Properties of LSO:Ce", IEEE Trans. Nucl. Sci. 2008, 55, 1178-1182.
Spurrier et al., The effect of co-doping on the growth stability and scintillation properties of lutetium oxyorthosilicate, J. Cryst. Growth 2008, 310, 2110-2114.
Weber, M. J., "Inorganic scintillators: today and tomorrow", Journal of Luminscience. 2002, 100, 35-45.
Wu et al., "Role of $Ce^{4+}$ in the Scintillation Mechanism of Codoped $Gd_3Ga_3A_{12}O_{12}$:Ce", Physical Rev. Appl. 2014, 2 044009, 1-13.

* cited by examiner

LUTETIUM BASED OXYORTHOSILICATE SCINTILLATORS CODOPED WITH TRANSITION METALS

RELATED APPLICATIONS

This application claims the benefit of U.S. Provisional Patent Application Ser. No. 62/830,081, filed Apr. 5, 2019; the disclosure of which is incorporated herein by reference in its entirety.

PARTIES TO A JOINT RESEARCH AGREEMENT

The subject matter disclosed herein was made by, on behalf of, and/or in connection with one or more of the following parties to a joint research agreement: Siemens Medical Solutions USA, Inc., and The University of Tennessee. The agreement was in effect on and before the effective filing date of the presently disclosed subject matter, and the presently disclosed subject matter was made as a result of activities undertaken within the scope of the agreement.

TECHNICAL FIELD

The presently disclosed subject matter relates to methods of altering the optical and/or scintillation properties of lutetium based oxyorthosilicate scintillators, such as lutetium oxyorthosilicate (LSO) and lutetium-yttrium oxyorthosilicate (LYSO), and to lutetium based oxyorthosilicate scintillators that are codoped with transition metal ions. The presently disclosed subject matter further relates to radiation detectors comprising the scintillator materials and to methods of using the scintillator materials to detect radiation.

ABBREVIATIONS

%=percentage
° C.=degrees Celsius
at %=atomic percentage
Ca=calcium
Ce=cerium
cm=centimeters
$cm^{-1}$=inverse centimeters
Cs=cesium
CT=computed tomography
Cu=copper
Cz=Czochralski
g=grams
K=Kelvin
keV=kiloelectron volts
LSO=lutetium oxyorthosilicate
Lu=lutetium
LY=light yield
LYSO=lutetium-yttrium oxyorthosilicate
MeV=megaelectronvolt
Mg=magnesium
mm=millimeter
mol %=mole percent
nm=nanometer
ns=nanoseconds
PET=positron emission tomography
ph=photons
PL=photoluminescence
PLE=photoluminescence excitation
pm=picometers
PMT=photomultiplier tube
ppm=parts-per-million
RL=radioluminescence
TL=thermoluminescence
TOF=time-of-flight
UV=ultraviolet
Y=yttrium

BACKGROUND

Scintillator materials, which emit light pulses in response to impinging radiation, such as X-rays, gamma rays, and thermal neutron radiation, are used in detectors that have a wide range of applications in medical imaging, particle physics, geological exploration, security and other related areas. Considerations in selecting scintillator materials typically include, but are not limited to, luminosity, decay time, energy resolution, and emission wavelength.

Lutetium oxyorthosilicate (LSO, $Lu_2SiO_5$) activated with cerium ($Ce^{3+}$) is a crystal scintillator material that has been used for medical imaging, such as gamma-ray detection in positron emission tomography (PET), as well as other applications. Due at least partly to its relatively high light yield and short decay time, LSO is considered to be a suitable material for molecular imaging applications, particularly for time-of-flight PET (TOF PET). LSO scintillators are typically made of single-crystal LSO grown from a melt using, for example, the Czochralski process.

While LSO scintillators in general have been developed, there is an ongoing need to develop LSO and other lutetium (Lu)-based oxyorthosilicate scintillators with improved properties for particular applications.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a scintillator material comprising:

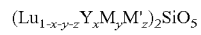

$$(Lu_{1-x-y-z}Y_xM_yM'_z)_2SiO_5$$

wherein: $0 \leq x \leq 1$; $0 \leq y \leq 0.1$; $0.0003 \leq z \leq 0.05$; M is one or more or two or more of Ce, Pr, Nd, Sm, Eu, Tb and Yb; and M' is one or more or two or more transition metal element ions selected from the group comprising Cr, Mn, Fe, Co, Ni, Cu, Tc, Ru, Rh, Pd, Ag, Re, Os, Ir, Pt, and Au. In some embodiments, the scintillator material is a single crystal, polycrystalline, or a ceramic material. In some embodiments, $0.0005 \leq z \leq 0.005$. In some embodiments, $0.001 \leq z \leq 0.003$. In some embodiments, M' is Cu.

In some embodiments, $0 < y \leq 0.1$. In some embodiments, $0.0005 \leq y \leq 0.01$. In some embodiments, y is 0.001. In some embodiments, M comprises Ce and the scintillator material is $Ce^{4+}$ free.

In some embodiments, x is 0 and the scintillator material is LSO:0.1% Ce, 0.1% Cu or LSO:0.1% Ce, 0.3% Cu.

In some embodiments, the scintillator material has a light yield of greater than 33,000 photons per megaelectronvolt (ph/MeV). In some embodiments, the scintillator material has a light yield of greater than 37,000 ph/MeV. In some embodiments, the scintillator material has a light yield of about 38,800 ph/MeV. In some embodiments, the scintillator material has an energy resolution of about 9 percent (%) or less at 662 kiloelectronvolts (keV). In some embodiments, the scintillator material has a photoluminescence decay time of about 34 nanoseconds or less. In some embodiments, the scintillator material has a scintillation decay time of about 44 nanoseconds or less. In some embodiments, the scintillator material has an afterglow that is reduced by about 50% or more compared to the non-codoped scintillator.

In some embodiments, the presently disclosed subject matter provides a radiation detector comprising a scintillator material comprising:

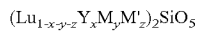

$$(Lu_{1-x-y-z}Y_xM_yM'_z)_2SiO_5$$

wherein: $0 \leq x \leq 1$; $0 \leq y \leq 0.1$; $0.0003 \leq z \leq 0.05$; M is one or more or two or more of Ce, Pr, Nd, Sm, Eu, Tb and Yb; and M' is one or more or two or more transition metal element ions selected from the group comprising Cr, Mn, Fe, Co, Ni, Cu, Tc, Ru, Rh, Pd, Ag, Re, Os, Ir, Pt, and Au. In some embodiments, the detector is a medical diagnostic device, a device for oil exploration, and/or a device for container, vehicle, human, animal, or baggage scanning. In some embodiments, the medical diagnostic device is a positron emission tomography (PET) device, a single photon emission computed tomography (SPECT) device or a planar nuclear medical imaging device. In some embodiments, the presently disclosed subject matter provides a method of detecting gamma rays, X-rays, cosmic rays, and particles having an energy of 1 keV or greater, the method comprising using the radiation detector.

In some embodiments, the presently disclosed subject matter provides a codoped lutetium oxyorthosilicate (LSO) or lutetium-yttrium oxyorthosilicate (LYSO) scintillator material, wherein said scintillator material has one or more property selected from the group comprising a light yield of greater than 33,000 photons per megaelectronvolt (ph/MeV), an energy resolution of about 9 percent (%) or less at 662 kiloelectronvolts (keV), a photoluminescence decay time of about 34 nanoseconds or less, a scintillation decay time of about 44 nanoseconds or less, and an afterglow that is reduced by about 50% or more compared to the non-codoped scintillator. In some embodiments, said scintillator material has a light yield of greater than 37,000 ph/MeV. In some embodiments, said scintillator material has a light yield of about 38,800 ph/MeV.

In some embodiments, the presently disclosed subject matter provides a radiation detector comprising a codoped lutetium oxyorthosilicate (LSO) or lutetium-yttrium oxyorthosilicate (LYSO) scintillator material, wherein said scintillator material has one or more property selected from the group comprising a light yield of greater than 33,000 photons per megaelectronvolt (ph/MeV), an energy resolution of about 9 percent (%) or less at 662 kiloelectronvolts (keV), a photoluminescence decay time of about 34 nanoseconds or less, a scintillation decay time of about 44 nanoseconds or less, and an afterglow that is reduced by about 50% or more compared to the non-codoped scintillator. In some embodiments, the detector is a medical diagnostic device, a device for oil exploration, and/or a device for container, vehicle, human, animal, or baggage scanning. In some embodiments, the medical diagnostic device is a positron emission tomography (PET) device, a single photon emission computed tomography (SPECT) device or a planar nuclear medical imaging device. In some embodiments, the presently disclosed subject matter provides a method of detecting gamma rays, X-rays, cosmic rays, and particles having an energy of 1 keV or greater, the method comprising using the radiation detector.

In some embodiments, the presently disclosed subject matter provides a method of altering one or more scintillation and/or optical properties of a LSO or a LYSO scintillator, the method comprising preparing the scintillator in the presence of a dopant ion and a codopant ion, and wherein the codopant ion is one or more or two or more transition metal element ions selected from Cr, Mn, Fe, Co, Ni, Cu, Tc, Ru, Rh, Pd, Ag, Re, Os, Ir, Pt, Au, and combinations thereof, and wherein the one or more or two or more transition metal element ions are present at between 30 ppm and 5000 ppm with respect to all cations. In some embodiments, preparing the scintillator in the presence of the dopant ion and the codopant ion provides a scintillator with one or more of the altered properties selected from the group comprising increased scintillation light yield, decreased scintillation decay time, decreased afterglow, and increased energy resolution as compared to a scintillator prepared in the presence of the dopant ion and in the absence of the codopant ion.

In some embodiments, the codopant ion is Cu. In some embodiments, the dopant ion comprises Ce and the scintillator material is free of $Ce^{4+}$.

It is an object of the presently disclosed subject matter to provide transition metal element codoped lutetium-based (e.g., LSO or LYSO) oxyorthosilicate scintillator materials, radiation detectors comprising the codoped scintillator materials, methods of using the radiation detectors, and methods of altering the scintillator and/or optical properties of the scintillator materials.

An object of the presently disclosed subject matter having been stated hereinabove, and which is achieved in whole or in part by the presently disclosed subject matter, other objects will become evident upon a review of the description and as the description proceeds when taken in connection with the accompanying drawings and examples as best described herein below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The optical absorption spectra of non-codoped LSO:Ce (LSO:Ce, dotted line), 0.1 at % calcium (Ca)-codoped LSO:Ce (LSO:Ce,0.1% Ca, solid line), and 0.3 at % Ca-codoped LSO:Ce (LSO:Ce,0.3% Ca, dashed line) single crystals are shown in the inset for comparison.

Figure 3A:
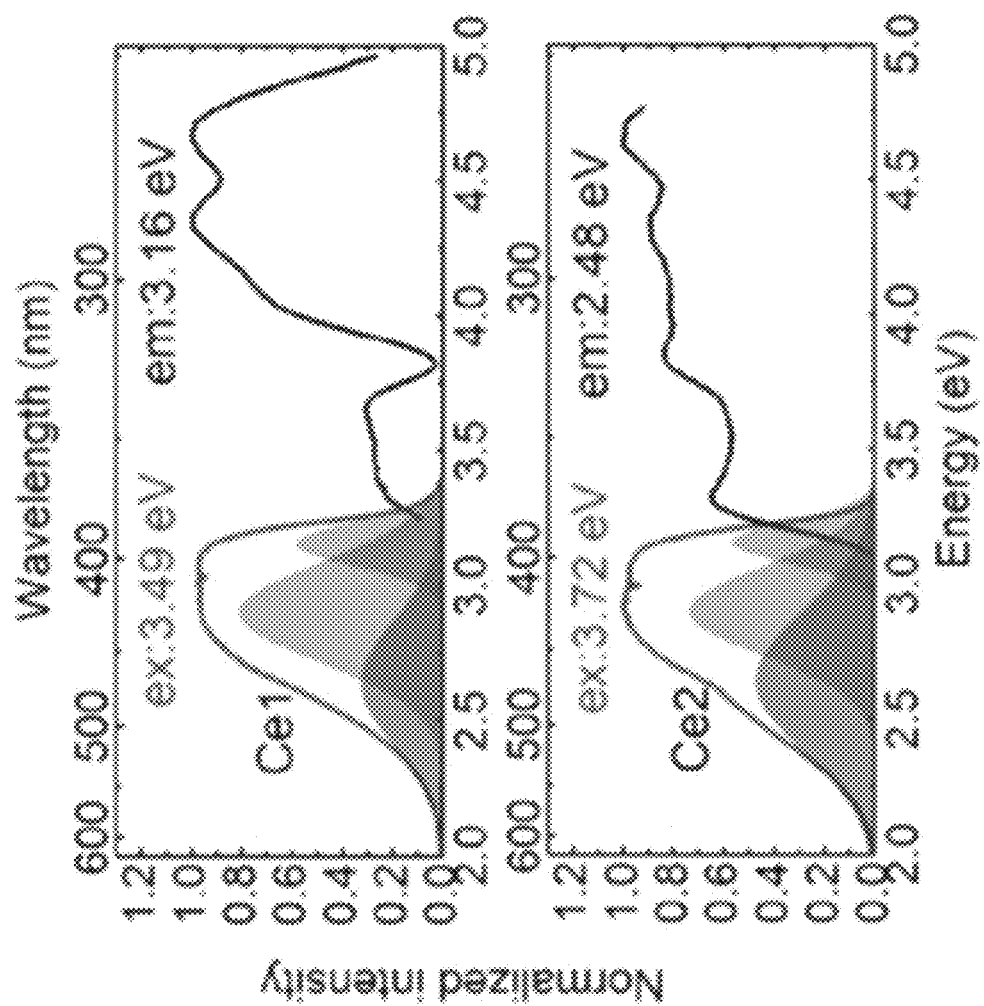

FIG. 3A is a pair of graphs showing the normalized photoluminescence emission (PL) and photoluminescence excitation (PLE) spectra (normalized intensity versus wavelength (in nanometers (nm)) of Ce1 (top) and Ce2 (bottom) centers in a non-codoped cerium (Ce)-doped lutetium oxyorthosilicate (LSO:Ce) material.

Figure 3B:
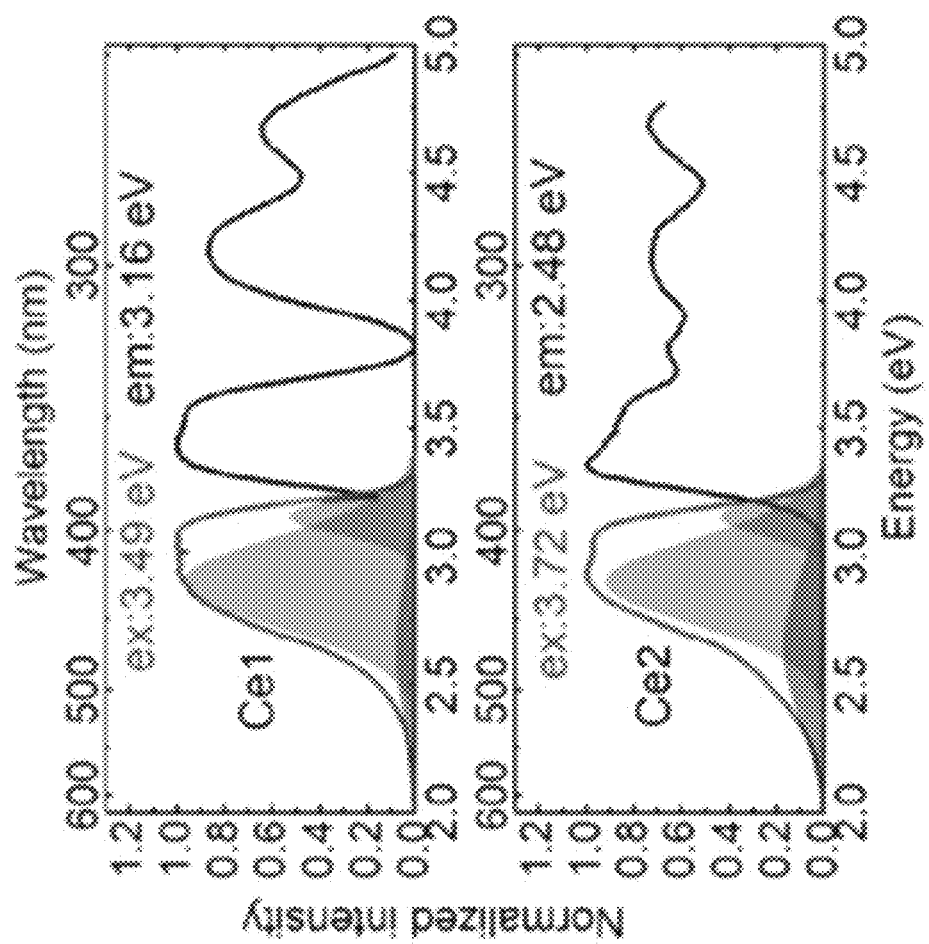

FIG. 3B is a pair of graphs showing the normalized photoluminescence emission (PL) and photoluminescence excitation (PLE) spectra (normalized intensity versus wavelength (in nanometers (nm)) of Ce1 (top) and Ce2 (bottom) centers in a 0.1 atomic percent (at %) copper (Cu)-codoped cerium (Ce)-doped lutetium oxyorthosilicate (LSO:Ce) material.

Figure 3C:
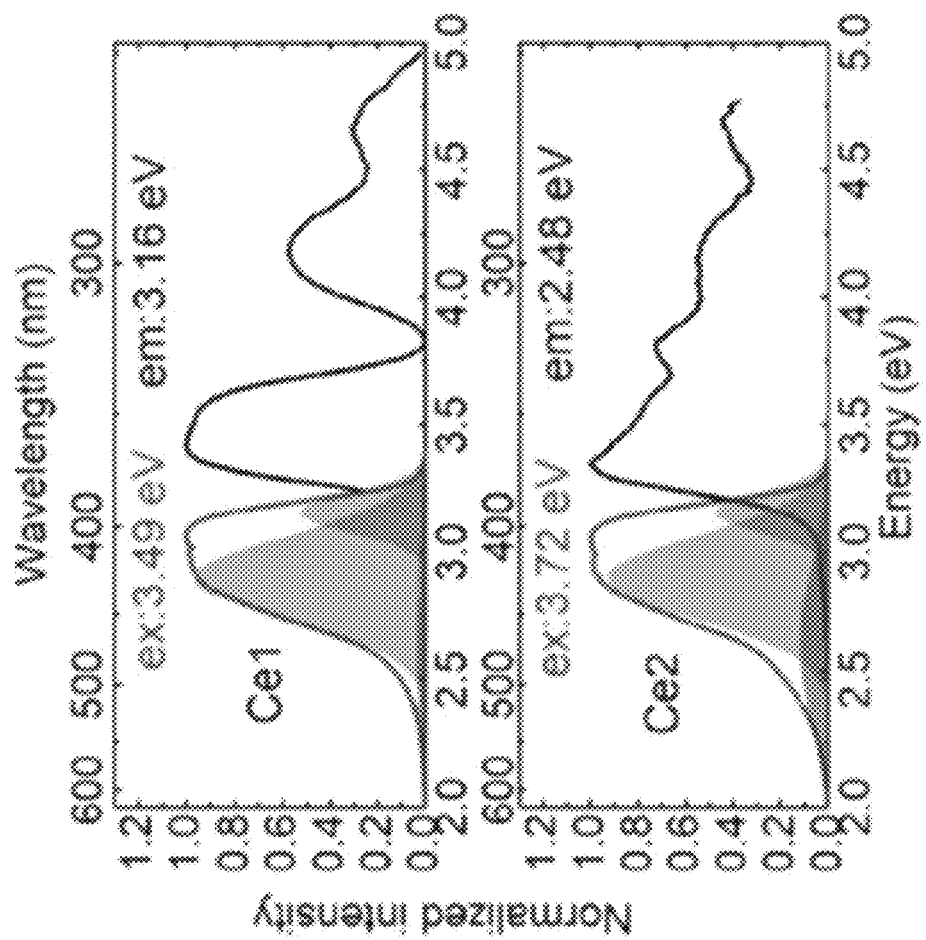

FIG. 3C is a pair of graphs showing the normalized photoluminescence emission (PL) and photoluminescence excitation (PLE) spectra (normalized intensity versus wavelength (in nanometers (nm)) of Ce1 (top) and Ce2 (bottom) centers in a 0.3 atomic percent (at %) copper (Cu)-codoped cerium (Ce)-doped lutetium oxyorthosilicate (LSO:Ce) material.

Figure 4A:
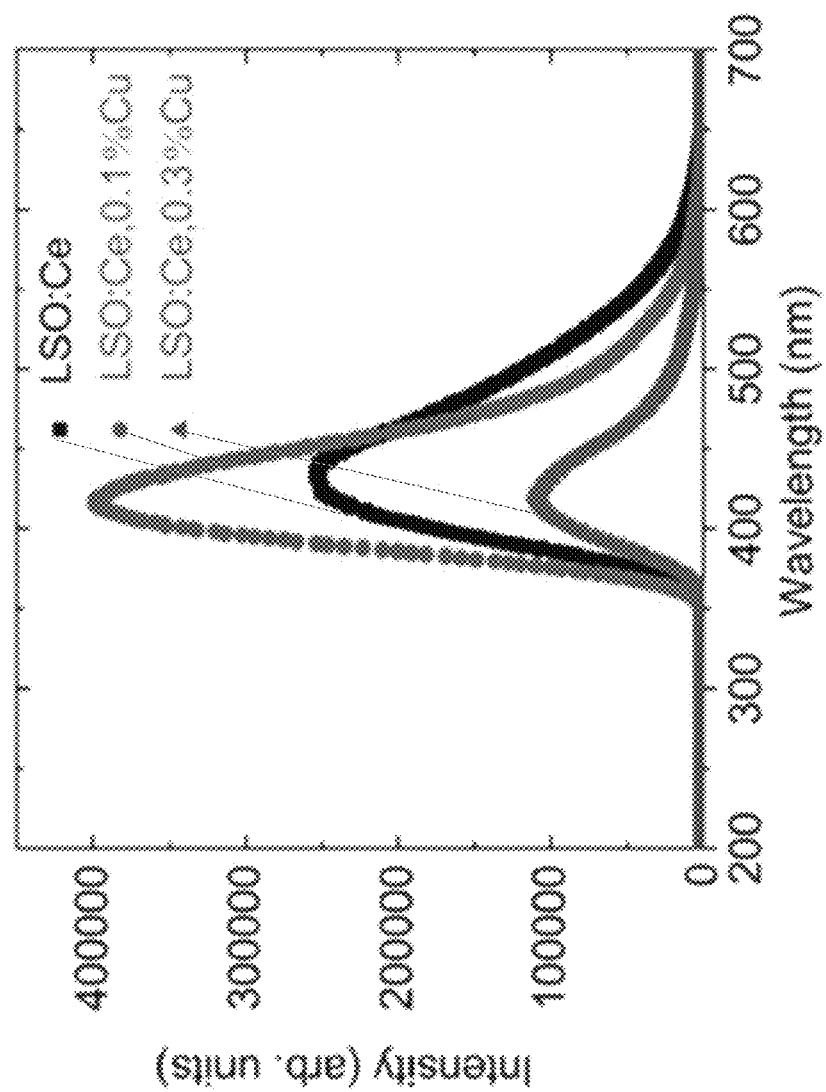

FIG. 4A is a graph showing the as measured X-ray excited radioluminescence (RL) spectra (intensity (in arbitrary units (arb. units)) versus wavelength (nanometers (nm))) of non-codoped cerium (Ce)-doped lutetium oxyorthosilicate (LSO:Ce, squares), 0.1 atomic percent (at %) copper (Cu)-codoped LSO:Ce (LSO:Ce,0.1% Cu, circles), and 0.3 at % Cu-codoped LSO:Ce (LSO:Ce,0.3% Cu, triangles).

Figure 4B:
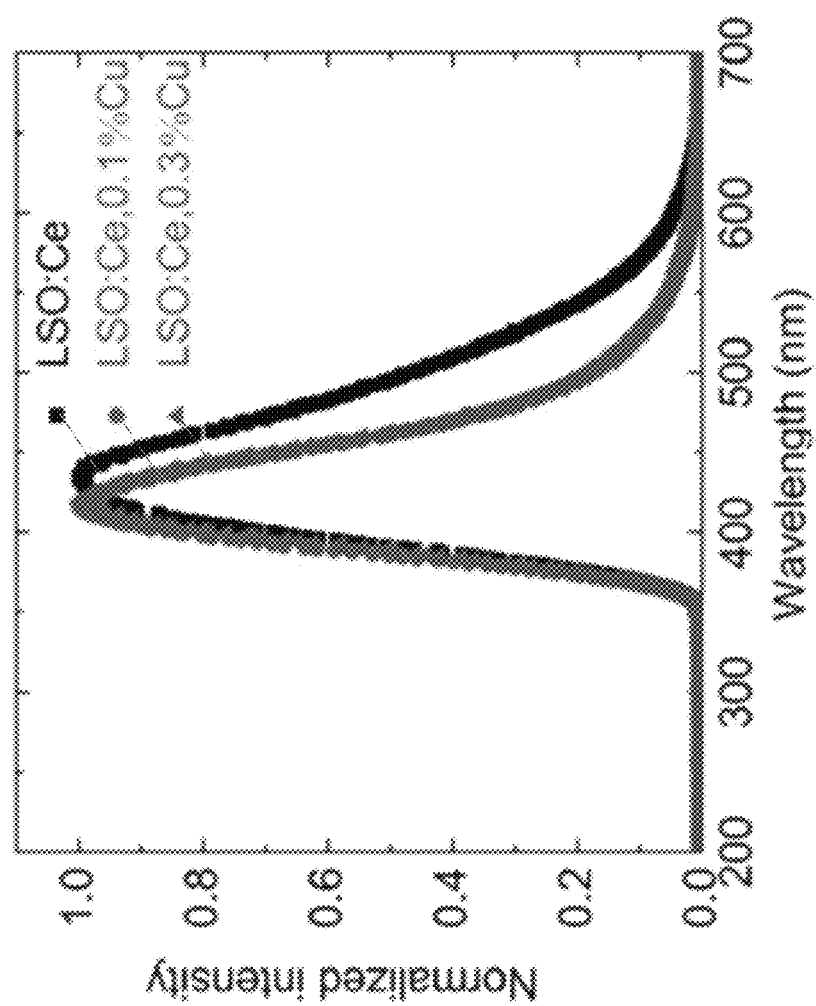

FIG. 4B is a graph showing the normalized X-ray excited radioluminescence (RL) spectra (normalized intensity versus wavelength (nanometers (nm))) of non-codoped cerium (Ce)-doped lutetium oxyorthosilicate (LSO:Ce, squares), 0.1 atomic percent (at %) copper (Cu)-codoped LSO:Ce (LSO:Ce,0.1% Cu, circles), and 0.3 at % Cu-codoped LSO:Ce (LSO:Ce,0.3% Cu, triangles).

Figure 5B:
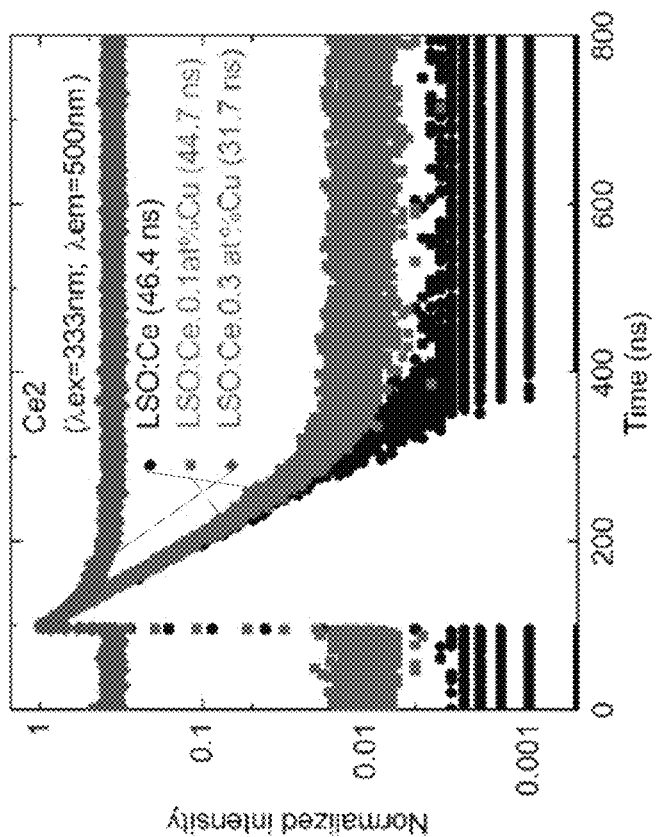
Figure 5A:
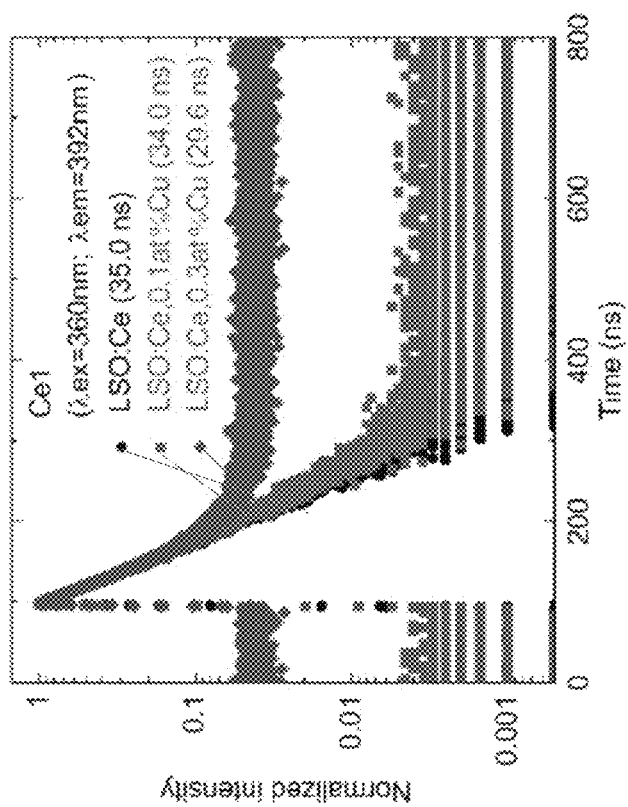

FIG. 5A is a graph showing the photoluminescence (PL) decay curves (normalized intensity versus time (in nanoseconds (ns))) of Ce1 centers in non-codoped, cerium (Ce)-doped lutetium oxyorthosilicate (LSO:Ce, circles), a 0.1 atomic percent (at %) copper (Cu)-codoped LSO:Ce (LSO:Ce,0.1 at % Cu, squares), and 0.3 at % Cu-codoped LSO:Ce (LSO:Ce,0.3 at % Cu, diamonds). The excitation wavelength is 360 nanometers (nm) and the emission wavelength is 392 nm. The decay time of LSO:Ce was 35.0 ns, the decay time of LSO:Ce,0.1 at % Cu was 34.0 ns, and the decay time of LSO:Ce,0.3 at % Cu was 29.6 ns.

FIG. 5B is a graph showing the photoluminescence (PL) decay curves (normalized intensity versus time (in nanoseconds (ns))) of Ce2 centers in non-codoped, cerium (Ce)-doped lutetium oxyorthosilicate (LSO:Ce, circles), a 0.1 atomic percent (at %) copper (Cu)-codoped LSO:Ce (LSO:Ce,0.1 at % Cu, squares), and 0.3 at % Cu-codoped LSO:Ce (LSO:Ce,0.3 at % Cu, diamonds). The excitation wavelength is 333 nanometers (nm) and the emission wavelength is 500 nm. The decay time of LSO:Ce was 46.4 ns, the decay time of LSO:Ce,0.1 at % Cu was 44.7 ns, and the decay time of LSO:Ce,0.3 at % Cu was 31.7 ns.

Figure 6:
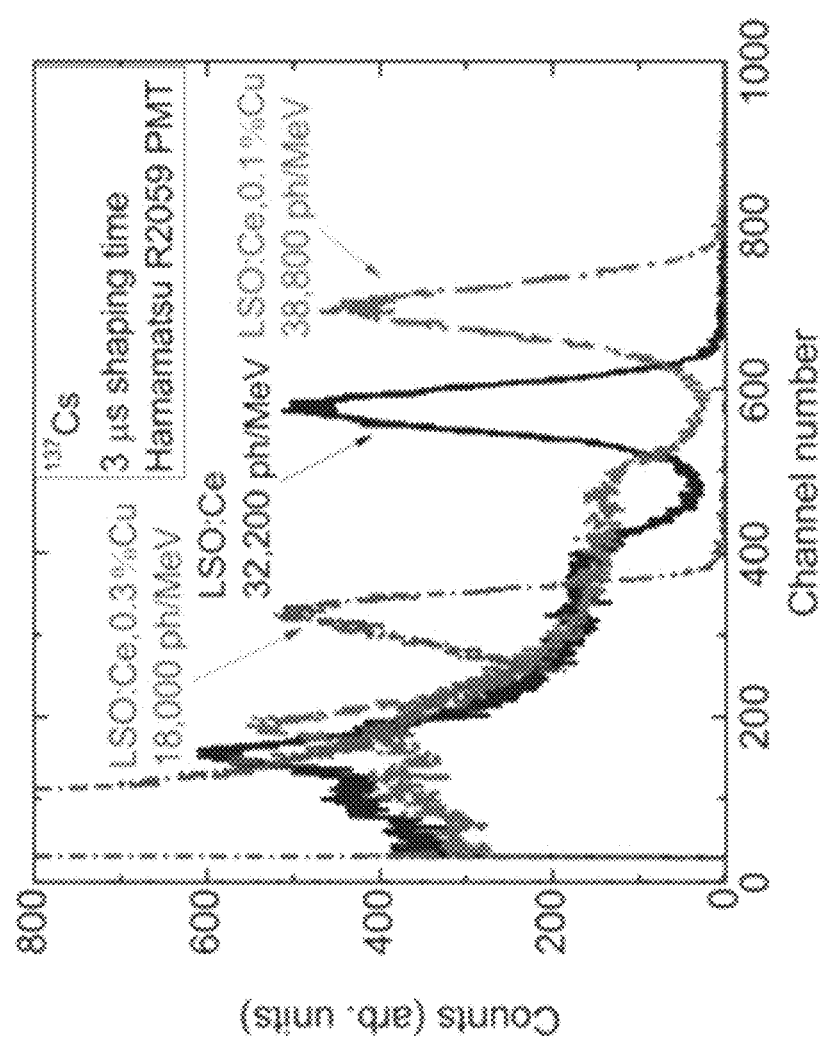

FIG. 6 is a graph of the cesium-137 ($^{137}$Cs) pulse height spectra (counts (in arbitrary units (arb. units)) versus channel number) of 5 cubic millimeter (mm$^3$) single crystals of non-codoped, cerium (Ce)-doped lutetium oxyorthosilicate (LSO:Ce), 0.1 atomic percent (at %) copper (Cu)-codoped LSO:Ce (LSO:Ce,0.1% Cu), and 0.3 at % Cu-codoped LSO:Ce (LSO:Ce,0.3% Cu). The light yield of LSO:Ce was 32,200 photons per megaelectronvolt (ph/MeV), the light yield of LSO:Ce,0.1% Cu was 38,800 ph/MeV, and the light yield of LSO:Ce,0.3% Cu was 18,000 ph/MeV.

Figure 7:
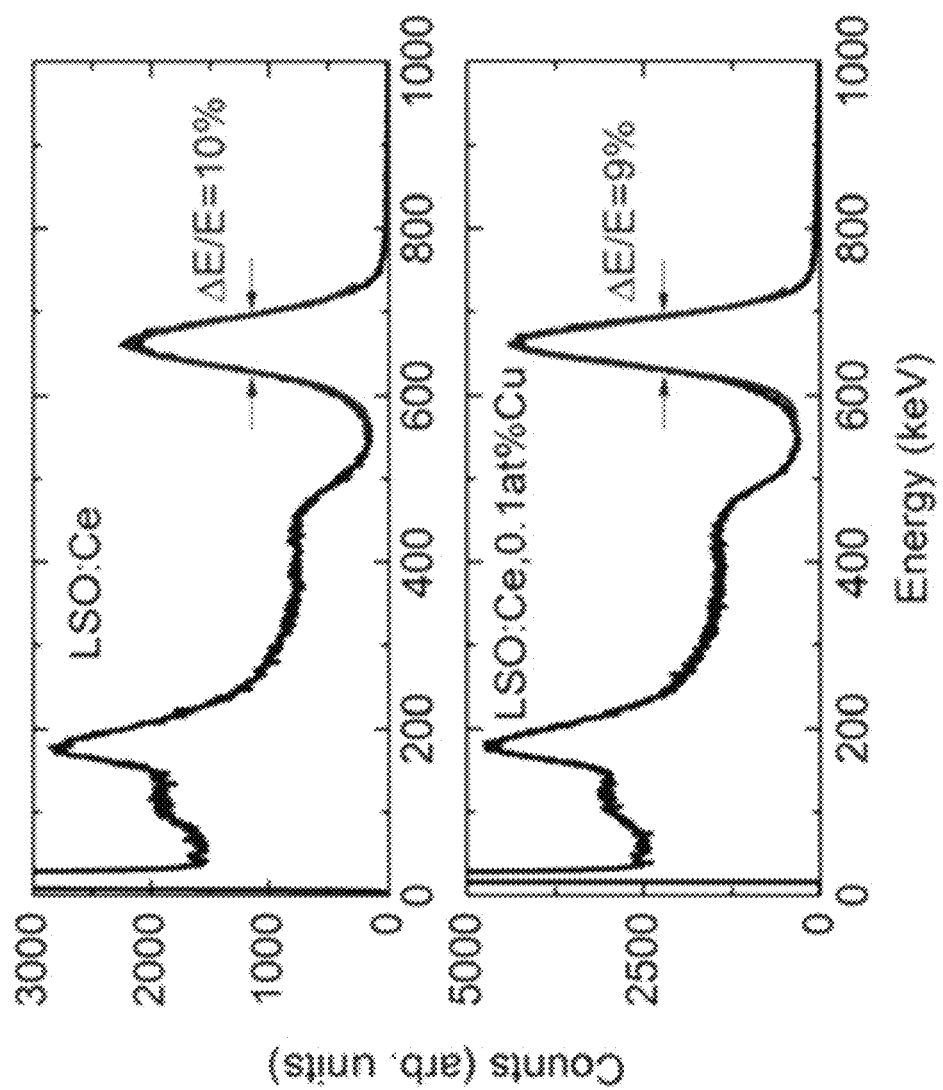

FIG. 7 is a pair of graphs of the cesium-137 ($^{137}$Cs) pulse height spectra (counts (in arbitrary units (arb. units)) versus energy (kiloelectron volts (keV))) obtained for energy resolution (ΔE/E) evaluation of 5 cubic millimeter (mm$^3$) single crystals of non-codoped, cerium (Ce)-doped lutetium oxyorthosilicate (LSO:Ce, top) and 0.1 atomic percent (at %) copper (Cu)-codoped LSO:Ce (LSO:Ce,0.1% Cu, bottom). Energy resolution improves slightly, from 10% to 9% for the codoped material.

Figure 8:
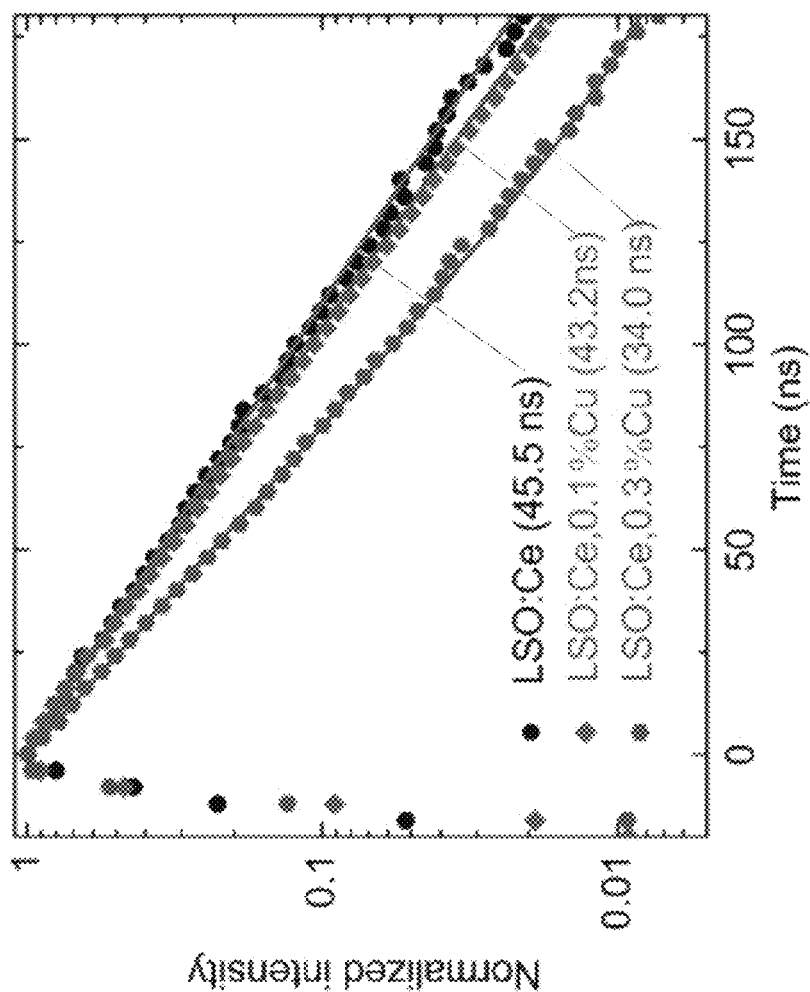

FIG. 8 is a graph showing the scintillation decay profiles (normalized intensity versus time (in nanoseconds (ns))) of 5 cubic millimeter (mm$^3$) single crystals of non-codoped, cerium (Ce)-doped lutetium oxyorthosilicate (LSO:Ce, circles), 0.1 atomic percent (at %) copper (Cu)-codoped LSO:Ce (LSO:Ce,0.1% Cu, diamonds), and 0.3 at % Cu-codoped LSO:Ce (LSO:Ce,0.3% Cu, hexagons). The scintillation decay time of LSO:Ce was 45.5 ns, the scintillation decay time of LSO:Ce,0.1% Cu was 43.2 ns, and the scintillation decay time of LSO:Ce,0.3% Cu was 34.0 ns.

Figure 9A:
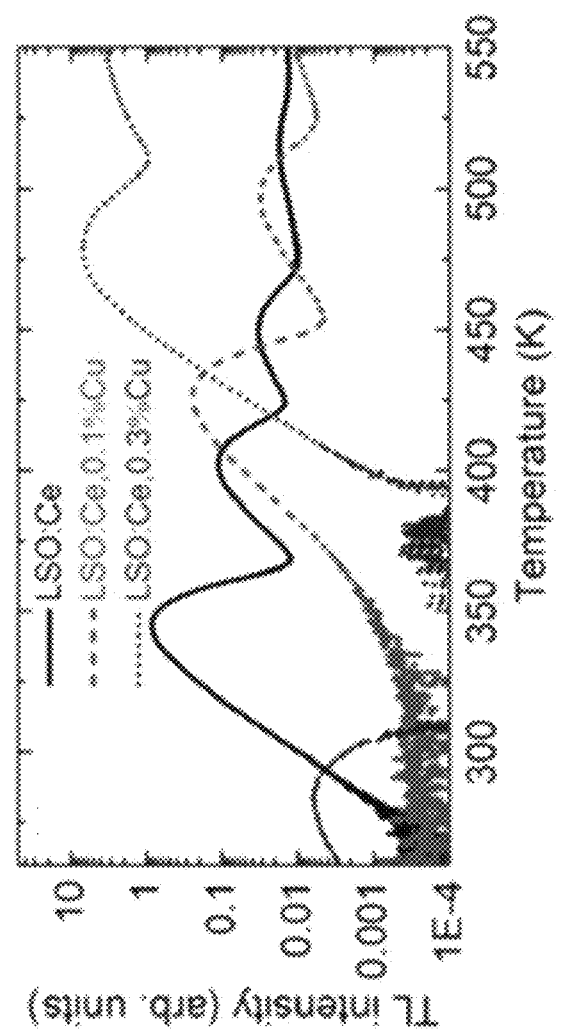

FIG. 9A is a graph showing the thermoluminescence (TL) glow curves (TL intensity (in arbitrary units (arb. units)) versus temperature (in Kelvin (K))) of single crystals of non-codoped, cerium (Ce)-doped lutetium oxyorthosilicate (LSO:Ce, solid line), 0.1 atomic percent (at %) copper (Cu)-codoped LSO:Ce (LSO:Ce,0.1% Cu, dashed line), and 0.3 at % Cu-codoped LSO:Ce (LSO:Ce,0.3% Cu, dotted line).

Figure 9B:
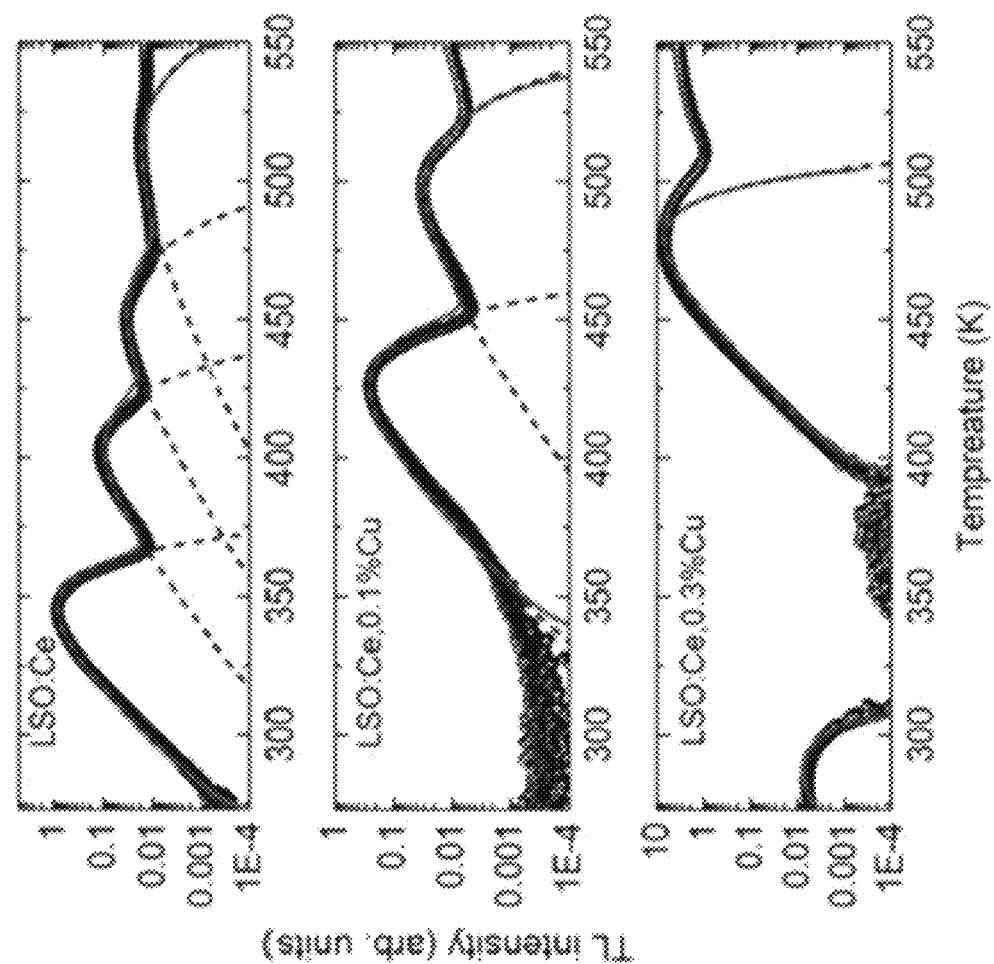

FIG. 9B is a graph showing the as-measured (heavy lines) and cumulative fitting (dashed lines) curves (TL intensity (in arbitrary units (arb. units) versus temperature (in Kelvin (K))) of single crystals of non-codoped, cerium (Ce)-doped lutetium oxyorthosilicate (LSO:Ce, top), 0.1 atomic percent (at %) copper (Cu)-codoped LSO:Ce (LSO:Ce,0.1% Cu, middle), and 0.3 at % Cu-codoped LSO:Ce (LSO:Ce,0.3% Cu, bottom).

Figure 10:
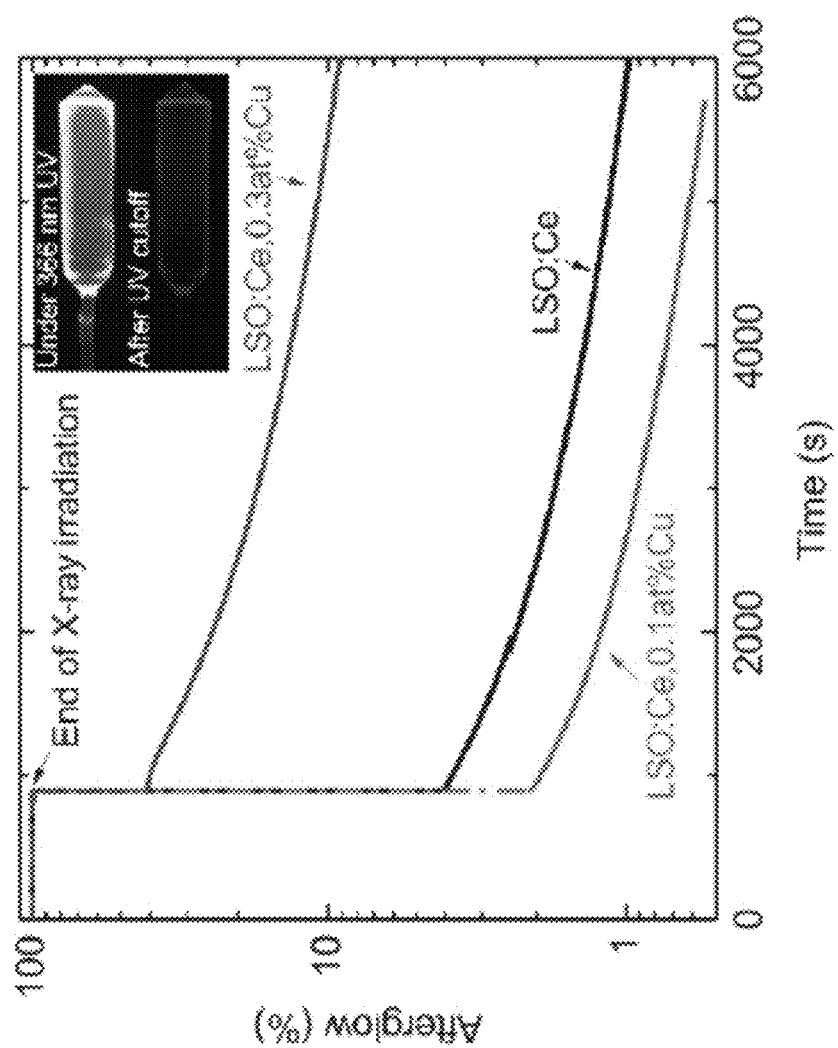

FIG. 10 is a graph showing the X-ray induced afterglow profiles (afterglow percent (%) versus time (in seconds (s))) of single crystals of non-codoped, cerium (Ce)-doped lutetium oxyorthosilicate (LSO:Ce), 0.1 atomic percent (at %) copper (Cu)-codoped LSO:Ce (LSO:Ce,0.1% Cu), and 0.3 at % Cu-codoped LSO:Ce (LSO:Ce,0.3% Cu). Inset are images of the as-grown boule codoped with 0.3 at % Cu under UV irradiation and after UV excitation cut-off for one minute.

Figure 11:
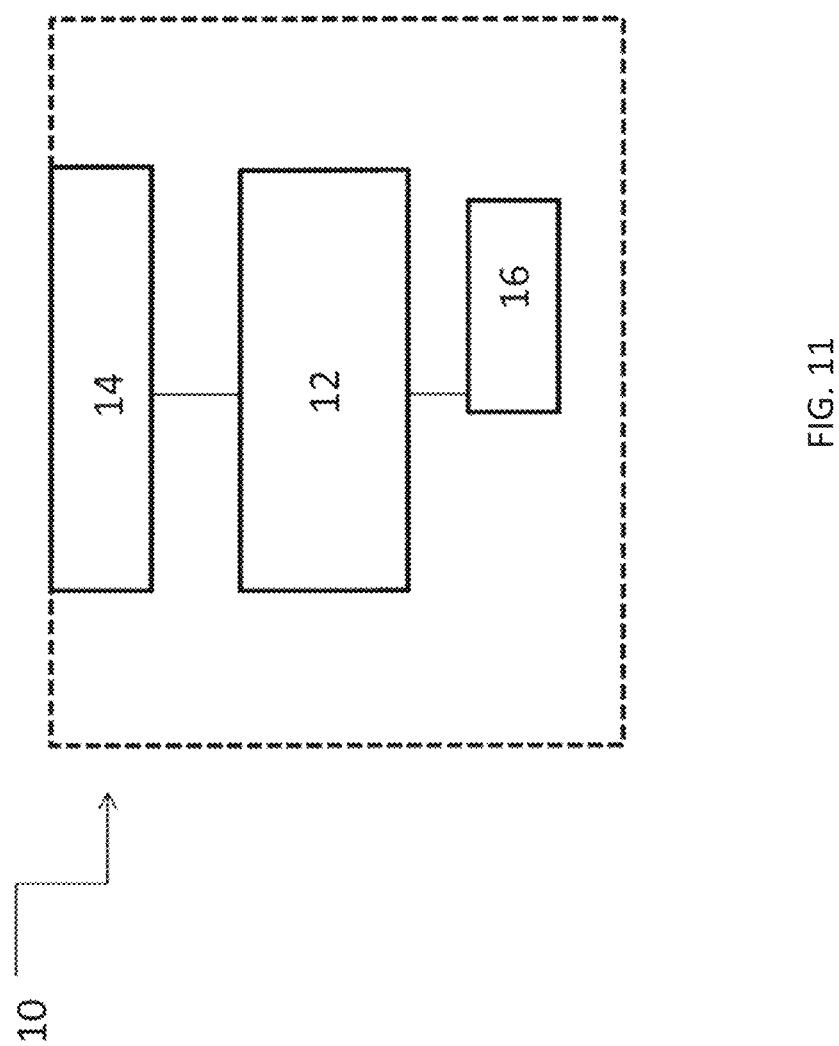

FIG. 11 is a schematic drawing of an apparatus for detecting radiation according to the presently disclosed subject matter. Apparatus 10 includes photon detector 12 optically coupled to scintillator material 14. Apparatus 10 can optionally include electronics 16 for recording and/or displaying electronic signal from photon detector 12. Thus, optional electronics 16 can be in electronic communication with photon detector 12.

DETAILED DESCRIPTION

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, light output, atomic (at) or mole (mol) percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "scintillator" refers to a material that emits light (e.g., visible light) in response to stimulation by high energy radiation (e.g., X, $\alpha$, $\beta$, or $\gamma$ radiation).

The term "phosphor" as used herein refers to a material that emits light (e.g., visible light) in response to irradiation with electromagnetic or particle radiation.

In some embodiments, the compositional formula expression of an optical material (e.g., a scintillation material or a phosphor) can contain a colon ":", wherein the composition of the main or base matrix material (e.g., the main Lu-based oxyorthosilicate matrix) is indicated on the left side of the colon, and the activator (or dopant ion) or the activator and the codopant ion are indicated on the right side of the colon. In some embodiments, the dopant and codopant can replace part of the Lu or other rare earth metal element(s) (e.g., Y) in a Lu-based oxyorthosilicate scintillator material. For example, $Lu_2SiO_5$:0.1Ce,0.1Cu; $Lu_2SiO_5$:0.1% Ce,0.1% Cu; and $Lu_2SiO_5$:$Ce^{3+}$ 0.1%, $Cu^{2+}$ 0.1% each represent a lutetium oxyorthosilicate optical material activated by cerium and codoped with copper, wherein 0.1 atomic % of the lutetium is replaced by cerium and 0.1 atomic % of the lutetium is replaced by copper. Thus, in some embodiments, the atomic % of a dopant can be expressed as the atomic % relative to the total amount of dopant and lutetium (or lutetium and yttrium; or dopant, Lu (or Lu and Y) and codopant) in the base material. The atomic % of the codopant ion can be expressed as the atomic or mole % relative to the total amount of Lu, Y, dopant and codopant.

The term "high energy radiation" can refer to electromagnetic radiation having energy higher than that of ultraviolet radiation, including, but not limited to X radiation (i.e., X-ray radiation), alpha ($\alpha$) particles, gamma ($\gamma$) radiation, and beta ($\beta$) radiation. In some embodiments, the high energy radiation refers to gamma rays, cosmic rays, X-rays, and/or particles having an energy of 1 keV or greater. Scintillator materials as described herein can be used as components of radiation detectors in apparatuses such as counters, image intensifiers, and computed tomography (CT) scanners.

"Optical coupling" as used herein refers to a physical coupling between a scintillator and a photosensor, e.g., via the presence of optical grease or another optical coupling compound (or index matching compound) that bridges the gap between the scintillator and the photosensor. In addition to optical grease, optical coupling compounds can include, for example, liquids, oils and gels.

"Light output" can refer to the number of light photons produced per unit energy deposited, e.g., by a gamma ray being absorbed, typically the number of light photons/MeV.

As used herein, chemical ions can be represented simply by their chemical element symbols alone (e.g., Pr for praseodymium ion(s) (e.g., $Pr^{3+}$) or Cu for copper ion(s) (e.g., $Cu^+$ or $Cu^{2+}$)). Similarly, the term "transition metal element" is used herein to refer to a transition metal element ion or a combination of transition metal element ions.

The term "transition metal element" as used herein refers to one or more elements selected Group IIIB, IVB, VB, VIB, VIIB, VIIIB, or IB of the Periodic Table. In some embodiments, transition metals include titanium (Ti), vanadium (V), chromium (Cr), manganese (Mn), iron (Fe), cobalt (Co), nickel (Ni), copper (Cu), zirconium (Zr), niobium (Nb), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), rutherfordium (Rf), dubnium (Db), seborgium (Sg), bohrium (Bh), hassium (Hs), meitnerium (Mt), darmstadtium (Ds), and roentgenium (Rg). In some embodiments, the transition metal element of the presently disclosed subject matter is not Ti, Zr, Hf, V, Nb, Ta, Mo or W.

The term "rare earth element" as used herein refers to one or more elements selected from a lanthanide (e.g., lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho) erbium (Er), thulium (Tm), ytterbium (Yb) and lutetium (Lu)), scandium (Sc), and yttrium (Y).

II. Transition Element-Codoped Lutetium-Based Oxyorthosilicates

Single crystals of Ce-doped LSO are commonly used in PET scanners because of their high density of 7.4 g/cm$^3$, high light yield of 75% that of NaI:Tl, and fast scintillation decay of about 40 ns. See Melcher and Schweitzer, IEEE Trans. Nucl. Sci. 1992, 39(4), 502-505; and Melcher et al., IEEE Trans. Nucl. Sci. 2003, 50(4), 762-766. Looking toward better timing resolution for TOF-PET applications, LSO scintillation yield, rise time and decay time have been improved by divalent codoping with alkaline earth metal ions (e.g., Ca$^{2+}$ or Mg$^{2+}$ ions). See Spurrier et al., IEEE Trans. Nucl. Sci. 2008, 55, 1178-1182; and Blahuta et al., IEEE Trans. Nucl. Sci. 2013, 60(4), 3134-3141. The increased light yield and shortened scintillation decay time were ascribed to the suppression of the defects that trap electrons and holes (see Yang et al., IEEE Trans. Nucl. Sci. 2009, 56(5), 2960-2965) and the introduction of stable Ce$^{4+}$ ions (see Blahuta et al., IEEE Trans. Nucl. Sci. 2013, 60(4), 3134-3141), respectively. Nonetheless, Ca$^{2+}$ codoping was found to lower the surface tension of the LSO melt, and when the Ca$^{2+}$ codoping concentration in the melt reaches 0.4 at % the solid-liquid interface can become unstable, resulting in an acentric (or off-axis) growth. See Spurrier et al., J. Cryst. Growth 2008, 310, 2110-2114. The acentric growth leads to an inhomogeneous distribution of optical and scintillation performance along the radial direction (see Wu et al., J. Cryst. Growth 2018, 498, 362-371) and a decrease of crystal yield. Using Zn$^{2+}$ as a codopant, it is possible to restore the growth stability by increasing the surface tension of the melt. See Spurrier et al., J. Cryst. Growth 2008, 310, 2110-2114.

Zagumennyi and coworkers have reported that codoping lutetium-based oxyorthosilicates with Cu can reduce crystal cracking as well as create waveguide properties. See U.S. Pat. No. 6,278,832. However, they also reported that Cu impurities are likely to introduce Ce$^{4+}$ ions in lutetium-based orthosilicates, and they describe Cu as a potentially harmful and undesirable impurity that results in reduced scintillation light output. In particular, they reported that Cu impurities should be controlled to under 30 ppm. See WO 2013/152434; U.S. Patent Application Publication No. 2014/0061537; and U.S. Patent Application Publication No. 2014/0291580. Contrary to that recommendation, the presently disclosed subject matter is based on the finding of several beneficial effects of divalent Cu codoping at a much higher concentration (e.g., at 0.1-0.2%), including simultaneous improvement of light yield, energy resolution, scintillation decay, and afterglow in LSO:Ce single crystals without destabilizing the solid-liquid interface or promoting acentric growth.

In some embodiments, the presently disclosed subject matter provides a method of tailoring the optical and/or scintillation properties (e.g., scintillation light yield, scintillation decay time, afterglow, rise time, energy resolution, proportionality, and sensitivity to light exposure) of Lu-based oxyorthosilicate scintillators (e.g., LSO and lutetium-yttrium oxyorthosilicate (LYSO) scintillators) to meet the particular needs of different applications. More particularly, in some embodiments, the presently disclosed subject matter relates to a method of altering one or more optical and/or scintillation property of a Lu-based oxyorthosilicate scintillator wherein the method comprises codoping the scintillator with at least one type of transition metal element ion at a molar ratio of between about 30 ppm and about 5000 ppm, between about 50 ppm and about 500 ppm, between about 90 ppm and about 300 ppm, or between about 100 ppm and about 300 ppm with respect to all cations. In some embodiments, the method comprises codoping the scintillator with at least one type of transition metal element ion at a molar ratio of between about 95 ppm and about 250 ppm (e.g., 95, 100, 125, 150, 175, 200, 225 or 250 ppm) or between about 100 ppm and about 200 ppm with respect to all cations.

In some embodiments, the transition metal ion is not one of Ti, Zr, Hf, V, Nb, Ta, Mo, or W. In some embodiments, the transition metal ion is one or more or two or more of Cr, Mn, Fe, Co, Ni, Cu, Tc, Ru, Rh, Pd, Ag, Re, Os, Ir, Pt and Au. In some embodiments, the transition metal is Cu or a mixture of Cu and another transition metal.

In some embodiments, the material does not comprise Ce as an activator or dopant. In some embodiments, the codoped oxyorthosilicate scintillator comprises Ce as an activator or dopant, but the scintillator is Ce$^{4+}$-free and has a reduction of Ce2 emission contribution. In some embodiments, the method provides a scintillator material comprising one or more of a modified scintillation decay time, modified afterglow, modified light yield and modified energy resolution. In some embodiments, the method provides a material with a decreased scintillation decay time, decreased afterglow, increased light yield, and/or improved energy resolution.

The presently disclosed subject matter further relates to the codoped oxyorthosilicate scintillators themselves, and related devices containing the codoped oxyorthosilicate scintillators, and to methods of using the devices to detect X-rays, gamma rays, and neutrons.

Accordingly, in some embodiments, the presently disclosed subject matter provides a scintillator material comprising a lutetium-based oxyorthosilicate doped with one or more activator ion and codoped with at least one transition metal element ion. In some embodiments, the lutetium-based oxyorthosilicate is codoped with at least one transition metal element ion at a molar ratio of between 30 ppm and 5000 ppm with respect to all cations.

In some embodiments, the scintillator material comprises:

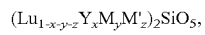

wherein

0≤x≤1;

0≤y≤0.1;

0.0003≤z≤0.05;

M is one or more or two or more of Ce, Pr, Nd, Sm, Eu, Tb and Yb; and

M' is one or more or two or more transition metal element ions.

In some embodiments, the material is a single crystal, polycrystalline or a ceramic material. Thus, in some embodiments, x is 0 and the scintillator is an LSO scintillator. In some embodiments, x is greater than 0 and the scintillator is a LYSO scintillator.

In some embodiments, $0<y\leq0.1$. In some embodiments, $0.0005\leq y\leq0.01$. In some embodiments, $0.001\leq y\leq0.005$. In some embodiments, y is about 0.001. In some embodiments, M is other than Ce (i.e., M is Pr, Nd, Sm, Eu, Tb, Yb, or a combination thereof). In some embodiments, M is Ce or Pr.

Codopant M' can be any suitable transition metal element ion or a combination of transition metal element ions. In some embodiments, M' is one or more or two or more of the group comprising Cr, Mn, Fe, Co, Ni, Cu, Tc, Ru, Rh, Pd, Ag, Re, Os, Ir, Pt, and Au. In some embodiments, M' comprises Cu (e.g., $Cu^{2+}$). In some embodiments, M' is Cu (e.g., $Cu^{2+}$).

In some embodiments, $0.0005\leq z\leq0.005$. In some embodiments, $0.0009\leq z\leq0.003$. In some embodiments, $0.001\leq z\leq0.003$. In some embodiments $0.001\leq z\leq0.002$. In some embodiments, $0.00095\leq z\leq0.0025$. In some embodiments, $0.00095\leq z\leq0.0015$. In some embodiments, z is about 0.001.

In some embodiments, M is Ce and the scintillator material is $Ce^{4+}$ free.

In some embodiments, the scintillator material comprises LSO:0.1% Ce, 0.1% Cu or LSO:0.1% Ce,0.3% Cu.

In some embodiments, the scintillator material has a light yield of greater than about 33,000 photons per megaelectronvolt (ph/MeV) (e.g., greater than about 33,000; 34,000; 35,000; or about 36,000 ph/MeV). In some embodiments, the scintillator material has a light yield of greater than about 37,000 ph/MeV. In some embodiments, the scintillator material has a light yield of about 38,800 ph/MeV.

In some embodiments, the scintillator material has an energy resolution that is less than the energy resolution of a comparable non-codoped scintillator. In some embodiments, the scintillator has an energy resolution of about 9 percent (%) or less at 662 kiloelectronvolts (keV).

In some embodiments, the scintillator material has a shorter photoluminescence (PL) and/or scintillation decay time than a comparable non-codoped material. In some embodiments, the scintillator material has a PL decay time of about 34 nanoseconds (ns) or less. In some embodiments, the scintillator material has a PL decay time of about 32 ns or less (e.g., about 32, 31, or about 30 ns or less). In some embodiments, the scintillator material has a PL decay time of about 29.6 ns. In some embodiments, the scintillator material has a scintillation decay time of about 44 nanoseconds of less (e.g., about 44, 43, 42, 41, 40, 39, 38, 37, 36, 35, or about 34 ns).

In some embodiments, the scintillator has an afterglow that is reduced by about 50% or more compared to the non-codoped scintillator.

Accordingly, in some embodiments, the presently disclosed subject matter provides a codoped LSO or LYSO scintillator material, wherein said scintillator material has one or more property selected from the group comprising: a light yield of greater than 33,000 photons per megaelectronvolt (ph/MeV), an energy resolution of about 9 percent (%) or less at 662 kiloelectronvolts (keV), a photoluminescence decay time of about 34 nanoseconds or less, a scintillation decay time of about 44 nanoseconds or less, and an afterglow that is reduced by about 50% or more compared to the non-codoped scintillator.

In some embodiments, the presently disclosed subject matter provides a radiation detector comprising the codoped scintillator material as described herein. For example, the radiation detector can comprise one or more of the presently disclosed scintillator materials (which absorb radiation and emit light) and a photodetector (which detects said emitted light). The photodetector can be any suitable detector or detectors and can be or not be optically coupled (e.g., via optical grease or another optical coupling compound, such as an optical coupling oil or liquid) to the scintillator material for producing an electrical signal in response to emission of light from the scintillator material. Suitable photon detectors include, but are not limited to, photomultiplier tubes, photodiodes, CCD sensors, and image intensifiers. Thus, the photodetector can be configured to convert photons to an electrical signal. For example, a signal amplifier can be provided to convert an output signal from a photodiode into a voltage signal. The signal amplifier can also be designed to amplify the voltage signal. Electronics associated with the photodetector can be used to shape and digitize the electronic signal, e.g., for recording and/or displaying the electronic signal.

Referring now to FIG. 11, in some embodiments, the presently disclosed subject matter provides an apparatus 10 for detecting radiation wherein the apparatus comprises a photon detector 12 and a scintillator material 14 (e.g., a lutetium based oxyorthosilicate scintillator codoped with a transition metal element ion). Scintillator material 14 can convert radiation to light that can be collected by a charge-coupled device (CCD) or a photomultiplier tube (PMT) or other photon detector 12 efficiently and at a fast rate.

Referring again to FIG. 11, photon detector 12 can be any suitable detector or detectors and can be optically coupled (e.g., via optical grease or another optical coupling compound, such as an optical coupling oil or liquid) to the scintillator (e.g., the transition metal element ion codoped lutetium based oxyorthosilicate) for producing an electrical signal in response to emission of light from the scintillator. Thus, photon detector 12 can be configured to convert photons to an electrical signal. Electronics associated with photon detector 12 can be used to shape and digitize the electronic signal. Suitable photon detectors 12 include, but are not limited to, photomultiplier tubes, photodiodes, CCD sensors, and image intensifiers. Apparatus 10 can also include electronics 16 for recording and/or displaying the electronic signal.

In some embodiments, the radiation detector is configured for use as part of a medical or veterinary diagnostic device, a device for oil or other geological exploration (e.g., oil well logging probes), or as a device for security and/or military-related purposes (e.g., as a device for container, vehicle, or baggage scanning or for scanning humans or other animals). In some embodiments, the medical or veterinary diagnostic device is selected from, but not limited to, a positron emission tomography (PET) device, an X-ray computed tomography (CT) device, a single photon emission computed tomography (SPECT) device, or a planar nuclear medical imaging device. For example, the radiation detector can be configured to move (e.g., via mechanical and/or electronic controls) over and/or around a sample, such as a human or animal subject, such that it can detect radiation emitted from any desired site or sites on the sample. In some embodiments, the detector can be set or mounted on a rotating body to rotate the detector around a sample.

In some embodiments, the device can also include a radiation source. For instance, an X-ray CT device of the presently disclosed subject matter can include an X-ray source for radiating X-rays and a detector for detecting said X-rays. In some embodiments, the device can comprise a plurality of radiation detectors. The plurality of radiation detectors can be arranged, for example, in a cylindrical or other desired shape, for detecting radiation emitted from various positions on the surface of a sample.

In some embodiments, the presently disclosed subject matter provides a method for detecting radiation (or the absence of radiation) using a radiation detector comprising a scintillator as described hereinabove (e.g., a codoped oxyorthosilicate scintillator material). Thus, in some embodiments, the presently disclosed subject matter provides a method of detecting gamma rays, X-rays, cosmic rays and particles having an energy of 1 keV or greater, wherein the method comprises using a radiation detector comprising a transition metal ion codoped oxyorthosilicate as described herein. In some embodiments, the method can comprise providing a radiation detector comprising a photodetector and an optical (e.g., scintillator) material of the presently disclosed subject matter; positioning the detector, wherein the positioning comprises placing the detector in a location wherein the optical material is in the path of a beam of radiation (or the suspected path of a beam of radiation); and detecting light (or detecting the absence of light) emitted by the optical material with the photodetector. Detecting the light emitted by the optical material can comprise converting photons to an electrical signal. Detecting can also comprise processing the electrical signal to shape, digitize, or amplify the signal. The method can further comprise displaying the electrical signal or processed electrical signal.

The presently disclosed scintillator materials can be prepared via any suitable method as would be apparent to one of ordinary skill in the art upon a review of the instant disclosure. In some embodiments, the presently disclosed subject matter provides a method of preparing a codoped Lu-based oxyorthosilicate scintillator material (e.g., a codoped LSO or LYSO). In some embodiments, the presently disclosed subject matter provides a method for preparing a scintillator material that comprises preparing a crystal from a melt. In some embodiments, the melt can be prepared from suitable starting materials (such as oxides or carbonates, e.g., $CeO_2$, $Lu_2O_3$, $SiO_2$), mixed at a ratio based upon the desired elemental content of the scintillator. In some embodiments, the codoped Lu-based oxyorthosilicate scintillator material can be a crystal grown by the Czochralski (pulling-up) method. However, single crystals or polycrystalline materials and/or ceramics grown or produced by other methods can also be used as a scintillator material according to the present disclosure. For example, alternative methods for producing the materials include, but are not limited to the micro-pulling down method, Bridgman method, zone melt method, Edge-defined Film-fed Growth (EFG) method, and hot isostatic press (HIP) sintering method.

The scintillator materials can be provided as single crystals, as a polycrystalline material, and/or as a ceramic material. In some embodiments, the material is provided as a polycrystalline and/or ceramic material. The polycrystalline and/or ceramic material can have analogous physical, optical and scintillation properties as a single crystal otherwise having the same chemical composition.

In some embodiments, the method further comprises annealing the scintillator material for a period of time (e.g., between a few hours and a few days). The annealing can be performed, for example, in air, nitrogen, or a mixture of nitrogen and hydrogen. The annealing can be done at any suitable temperature, e.g., between about 800 and about 1600 degrees Celsius (e.g., about 800, 900, 1000, 1100, 1200, 1300, 1400, 1500, and about 1600 degrees Celsius).

In some embodiments, the presently disclosed subject matter provides a method of altering one or more scintillation and/or optical properties of a lutetium-based oxyorthosilicate scintillator, the method comprising preparing the lutetium-based oxyorthosilicate scintillator in the presence of a dopant ion and a codopant ion, and wherein the codopant ion is one or more or two or more transition metal element ions. In some embodiments, the codopant ion is Cu. In some embodiments, the codopant ion or ions are provided at about 5000 ppm or less with respect to all cations (e.g., Lu, Y, and dopant ion or ions). In some embodiments, the codopant ion or ions are provided at about 30 ppm to about 5000 ppm with respect to all cations. In some embodiments, the codopant ion or ions are provided at about 50 to about 500 ppm, about 90 to about 300 ppm, about 100 to about 300 ppm, about 100 to about 200 ppm, or at about 100 ppm with respect to all cations. In some embodiments, the codoping provides a Ce doped Lu-based oxyorthosilicate scintillator with a reduction in Ce2 emission. In some embodiments, the codoping provides a Ce-doped Lu-based oxyorthosilicate scintillator that is $Ce^{4+}$ free. In some embodiments, the Lu-based oxyorthosilicate scintillator is doped with a dopant other than Ce.

In some embodiments, each of the one or more scintillation and/or optical properties is selected from the group comprising scintillation light yield, scintillation decay time, afterglow, rise time, energy resolution, proportionality, and sensitivity to light exposure. In some embodiments, each of the one or more scintillator and/or optical properties is selected from scintillation decay time (i.e., faster or slower scintillation decay time), afterglow (i.e., increased or decreased afterglow), light yield (e.g., increased scintillation light yield), and energy resolution (i.e., improved energy resolution). In some embodiments, preparing the scintillator in the presence of the dopant ion and the codopant ion provides a scintillator with one or more of the altered properties selected from the group comprising increased scintillation light yield, decreased scintillation decay time, decreased afterglow, and increased energy resolution as compared to a scintillator prepared in the presence of the dopant ion and in the absence of the codopant ion.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Crystal Growth

The Czochralski (Cz) method was used to grow LSO:0.1 at % $Ce^{3+}$ crystals codoped with 0, 0.1, and 0.3 at % $Cu^{2+}$. The starting materials were $Lu_2O_3$, $SiO_2$, $CeO_2$, and CuO with at least 99.99% purity. The atomic percentage of the dopant and codopant concentrations is relative to that of lutetium in the melt. The dopant and codopant concentrations in the grown boule will be lower than the nominal concentration in the melt because of the segregation that occurs during growth. The crystals were grown in iridium crucibles which were loaded with raw materials and inductively heated by a 30 kW Hüttinger power supply (TRUMPF GmbH & Co. KG Hüttinger, Freiburg im Breisgau, Germany). The growth atmosphere was a mixture of nitrogen and a small fraction of oxygen. All as-grown boules are 32 mm in diameter and 110 mm long. All 5 mm³ samples used for measurements were cut from the middle section of their respective boules.

Example 2

Optical Property Measurements

Optical absorption spectra from 200 to 800 nm were acquired with a Varian Cary 5000 UV-VIS-IR spectrophotometer (Varian Inc., Palo Alto, Calif., United States of America).

Photoluminescence emission (PL) and excitation (PLE) spectra were recorded with a HORIBA™ Jobin Yvon Fluorolog-3 spectrofluorometer (HORIBA Ltd., Kyoto, Japan). A 450 W continuous xenon lamp was used as an excitation source. Photoluminescence decay profiles were conducted on the same spectrofluorometer using a time-correlated-single-photon counting module. The excitation sources are light emitting diodes (HORIBA™ Jobin Yvon NanoLEDs; HORIBA Ltd., Kyoto, Japan). The duration of the light pulse was shorter than 2 ns.

Example 3

Scintillation Performance Measurements

The scintillation decay profile was acquired with an Agilent DSO6104A digital oscilloscope (Agilent Technologies, Santa Clara, Calif., United States of America) in single shot mode under $^{137}Cs$ source irradiation.

The scintillation light yields (LY) were evaluated using a pulse processing chain that consists of a Hamamatsu R2059 photomultiplier tube (PMT, Hamamastu Photonics, K.K., Hamamatsu City, Japan), an Ortec 672 Amp (Advanced Measurement Technology, Inc., Oak Ridge, Tenn., United States of America), a Canberra model 2005 pre-Amp (Canberra Industries, Ind., Meridan, Conn., United States of America), and a Tukan 8k multi-channel analyzer (MCA, National Center for Nuclear Research, Świerk, Poland). A shaping time of 3 μs was used to achieve full light integration. Each sample was measured under irradiation with a 15 μCi $^{137}Cs$ source. To maximum the light collection, mineral oil was used as a couplant between the sample and the PMT, and a 50 mm diameter PTFE-lined dome-shaped reflector was used as a top reflector. The error bar of the LY is ±5%. The energy resolutions of the samples at 662 keV were evaluated by using a Hamamatsu R6231-100 PMT (Hamamastu Photonics, K.K., Hamamatsu City, Japan).

X-ray radioluminescence (RL) measurements were conducted in a transmission mode under excitation of a copper x-ray source operated at 35 kV and 0.1 mA. The emission signals were detected with a focal length monochromator and a broadband PMT. The emission intensities were corrected by the acquisition software based on the spectral sensitivity of the PMT.

The room temperature afterglow profiles of the samples were acquired using a Hamamatsu R2059 PMT (Hamamastu Photonics, K.K., Hamamatsu City, Japan) operated at −1500 $V_{bias}$. To enhance the light collection, a Tetratex® TX3104 PTFE membrane (Donaldson Company, Minneapolis, Minn., United States of America) was used as a reflector. The samples were stored in the dark for 24 hours before measurements. The samples irradiated with X-rays for 15 min while being held in the dark, and the emission signals from each sample were recorded immediately after irradiation cut-off.

Example 4

Thermoluminescence Measurements

Thermoluminescence (TL) glow curves were acquired in the temperature range of 275 to 550 K. After X-ray irradiation at 275 K with an X-ray tube operated at 35 kV and 0.1 mA for 15 min, the TL glow curve was recorded while heating the sample at a rate of 3 K/min. Prior to the TL measurements, the samples were individually heated to 550 K to ensure that all traps in the temperature range were empty. A Hamamatsu R2059 PMT (Hamamastu Photonics, K.K., Hamamatsu City, Japan) optically coupled to a cryostat's borosilicate window was used to record the spectrally unresolved emission from the sample. Standard National Institute Module (NIM) electronics were used to convert the PMT current signal into a voltage signal. The voltage signal was digitized by a National Instruments 6002-E data acquisition card (National Instruments, Austin, Tex., United States of America). The sample temperature and the signal intensity were correlated.

Example 5

Discussion of Examples 1-4

Figure 1:
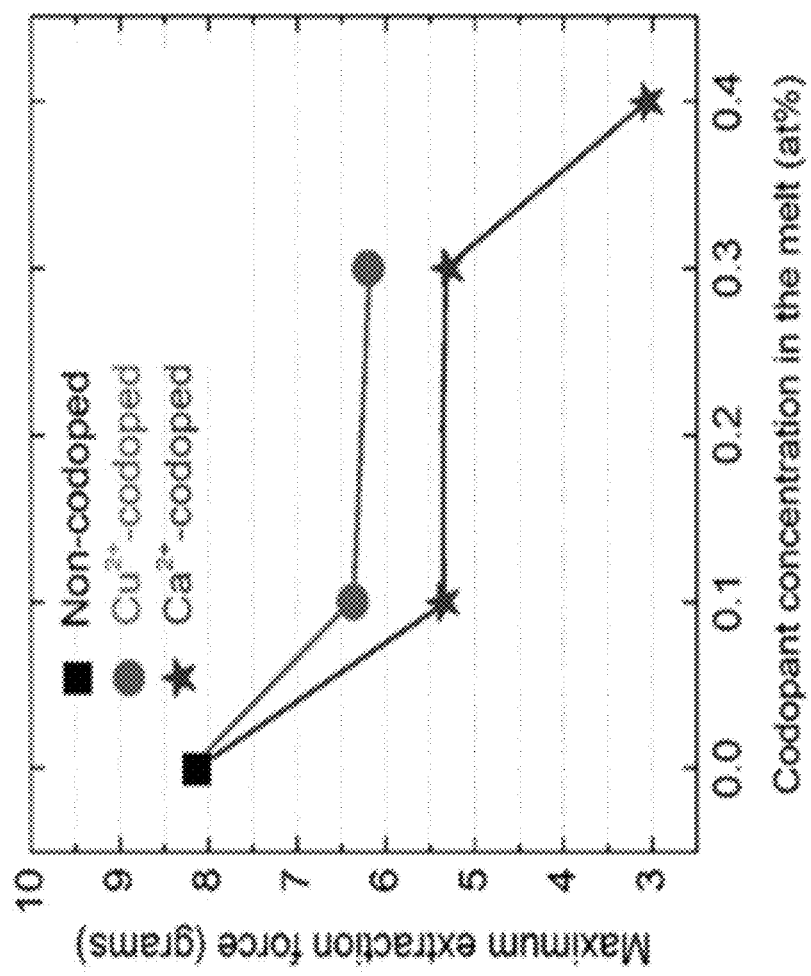
FIG. 1 is a graph showing the maximum extraction force (measured in grams) required to separate copper ($Cu^{2+}$)-codoped, cerium (Ce)-doped lutetium oxyorthosilicate (LSO) boules comprising different concentrations of codopant (as indicated in the x-axis) from the melt, as well as results for non-codoped and 0.1, 0.3, and 0.4 atomic percentage (at %) calcium ($Ca^{2+}$)-codoped Ce-doped LSO previously published in Spurrier et al., J. Cryst. Growth 2008, 310, 2110-2114. Data for the $Cu^{2+}$-codoped materials is shown in circles, data for the $Ca^{2+}$-codoped materials is shown in stars, and data for the non-codoped material is shown with a square.

Stable Crystal Growth of $Cu^{2+}$ Codoped LSO:Ce with Reduced Surface Tension of the Melt:

The effect of $Cu^{2+}$ codoping on the surface tension of the LSO melt was investigated by using a previously described method. See Spurrier et al., J. Cryst. Growth 2008, 310, 2110-2114. When a grown boule is extracted from the melt, the force exerted on the melt surface can be seen by an increase in the mass reading on the associated load cell, this continues to increase until reaching a maximum value. The difference between the initial mass reading and the maximum value can be used to make a relative comparison of the surface tension of the melt for each composition. The surface tension is proportional to the maximum force required to extract the boule from the melt. See KSV INSTRUMENTS LTD., "Surface and interfacial tension", Application Note #101. The maximum extraction forces for 0.1 and 0.3 at % $Cu^{2+}$ codoped LSO:Ce boules are plotted in FIG. 1, as well as the published values for non-codoped, 0.1, 0.3, and 0.4 at % $Ca^{2+}$ codoped LSO:Ce for comparison. The surface tension of the $Cu^{2+}$ codoped LSO:Ce melt is lower than that of non-codoped one, but still higher than that of $Ca^{2+}$ codoped ones with equivalent codopant concentration in the melt. The as-grown LSO:Ce boules codoped with 0.1 and 0.3 at % $Cu^{2+}$ are not only highly transparent and almost crack-free, but also without any tendency toward acentric growth. Without being bound to any one theory, these observations indicate that the reduced surface tension induced by $Cu^{2+}$ codoping is not large enough to cause growth instability.

Figure 2:
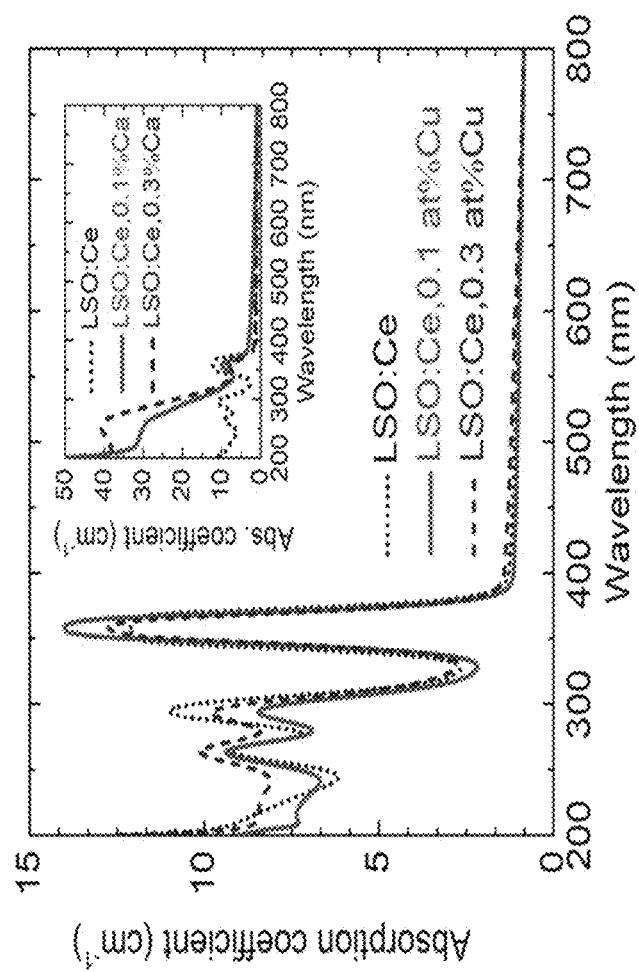
FIG. 2 is a graph showing the optical absorption spectra (absorption coefficient in inverse centimeters ($cm^{-1}$) versus wavelength (in nanometers (nm))) of non-codoped, cerium (Ce)-doped lutetium oxyorthosilicate (LSO:Ce, dotted line), 0.1 atomic percent (at %) copper (Cu)-codoped LSO:Ce (LSO:Ce,0.1 at % Cu, solid line), and 0.3 at % Cu-codoped LSO:Ce (LSO:Ce,0.3 at % Cu, dashed line) single crystals.

Ce Valence State: Non-Conversion of Stable $Ce^{3+}$ to $Ce^{4+}$:

Optical absorption spectroscopy is a qualitative tool to identify the presence of stable $Ce^{4+}$ ions in Ce doped oxides due to the detectable ligand-to-metal charge transfer (CT) transition of $Ce^{4+}$. See Blahuta et al., IEEE Trans. Nucl. Sci. 2013, 60(4), 3134-3141; Wu et al., Phys. Rev. Appl. 2014, 2 044009, 1-13; Nikl et al., Cryst. Growth Des. 2014, 14, 4827-4833; Liu et al., Phys. Status Solidi RRL, 2014, 8, 105-109; and Chewpraditkul et al., Opt. Mater. 2013, 35, 1679-1684. Because of the partial conversion of stable $Ce^{3+}$ into $Ce^{4+}$ ions in an LSO (or LYSO) host induced by divalent Ca and Mg codoping (see Blahuta et al., IEEE Trans. Nucl. Sci. 2013, 60(4), 3134-3141; and Chewpraditkul et al., Opt. Mater. 2013, 35, 1679-1684), and the importance of stable $Ce^{4+}$ fortiming properties (see Kochurikhin et al., J. Crystal Growth 1996, 160, 181-183; Nikl et al., Cryst. Growth Des. 2014, 14, 4827-4833; and Liu et al., Phys. Status Solidi RRL, 2014, 8, 105-109), the effect of divalent Cu codoping on the Ce valence state was investigated. As seen in FIG. 2, the spectrum of non-codoped LSO:Ce shows typical $Ce^{3+}$ 4f-5d absorptions. The Ce oxidation state in Cz-grown LSO:Ce single crystals has been proven to be purely trivalent by both X-ray absorption spectroscopy and electron energy loss spectroscopy. See Melcher et al., IEEE Trans. Nucl. Sci. 2005, 52, 1809-1812; and Wu et al., Phys. Status Solidi RRL2019, 13, 1800472 1-5. The spectra of $Cu^{2+}$ codoped LSO:Ce samples, regardless of $Cu^{2+}$ concentration, also show the $Ce^{3+}$ 4f-5d absorptions without the presence of CT absorption band of $Ce^{4+}$. This indicates that the stable $Ce^{3+}$ will not be converted into $Ce^{4+}$ with $Cu^{2+}$ codoping, dissimilar to the effect of $Cu^+$ (see U.S. Pat. No. 6,278,832) and $Ca^{2+}$ codoping (see FIG. 2 inset). See Spurrier et al., IEEE Trans. Nucl. Sci. 2008, 55, 1178-1182; and Blahuta et al., IEEE Trans Nucl. Sci. 2013, 60(4), 3134-3141. The Cu valence state in LSO is expected to maintain +2 or reach a higher valence state (+3 or +4) rather than +1; because, since the Cu atoms coordinate with highly electronegative oxygen atoms in the LSO host lattice, there should be enough electron affinity and electrostatic attraction to draw off 3d valence electron(s).

Luminescence Characteristics of Ce1 and Ce2 Centers: The Suppression of Ce2 Emission and an Enhanced Ionization of the $Ce^{3+}$ 5d, State:

In the LSO host lattice, Ce ions are known to occupy two different Lu sites. Ce1 is usually designated to the Lu site neighboring to seven oxygens, and Ce2 is designated to the Lu site neighboring to six oxygens. See Cooke et al., Phys. Rev. B 2000, 61, 11973-11978; and Ning et al., J. Mater. Chem. 2012, 22 13723-13731. Ce1 and Ce2 centers have distinct spectral properties and decay kinetics. The $Ce^{3+}$ 5d-4f emissions of Ce1 centers are at 3.15 and 2.9 eV with a PL decay of 33 ns, and 2.64 eV for Ce2 centers with a PL decay of 46 ns. See Jary et al., Opt. Mater. 2011, 34, 428-432; and Ding et al., J. Solid State Chem. 2014, 209, 56-62. The PL, PLE, and RL spectra, and PL decays were used to study the effects of $Cu^{2+}$ codoping on the luminescence characteristics of Ce1 and Ce2 centers.

FIGS. 3A-3C show the normalized PL and PLE spectra of Ce1 and Ce2 centers in non-codoped and $Cu^{2+}$ codoped LSO:Ce. All the emission spectra can be well fitted with three Gaussian peaks with maximums at 3.15 eV (393 nm), 2.91 eV (426 nm), and 2.64 eV (470 nm). See Jary et al., Opt. Mater. 2011, 34, 428-432; and Ding et al., J. Solid State Chem. 2014, 209, 56-62. The two peaks at 2.91 and 3.15 are Ce1 emissions, and the peak at 2.64 eV is Ce2 emission. As the $Cu^{2+}$ codoping concentration increases, the emission contribution from Ce2 centers gradually decreases. It should be noted that monovalent Li codoping can also reduce the emission contribution from Ce2 without formation of stable $Ce^{4+}$. See Wu et al., ACS Appl. Mater. Interface 2019, 11, 8194-8201. The reduction/suppression of Ce2 emission was also observed in $Ca^{2+}$ codoped LSO:Ce, which was attributed to the occupation of Ce2 sites by optically inactive $Ce^{4+}$ ions instead of $Ce^{3+}$ ions, as a result of charge compensation due to $Ca^{2+}$ codoping. See Wu et al., J. Cryst. Growth 2018, 498, 362-371. However, this explanation does not apply to the case of $Cu^{2+}$ codoping because no stable $Ce^{4+}$ was created by $Cu^{2+}$ codoping. The as-measured RL spectra of non-codoped, 0.1 at %, and 0.3 at % $Cu^{2+}$ codoped LSO:Ce are shown in FIG. 4A. A 20% increase of scintillation efficiency of LSO:Ce is achieved by 0.1 at % Cu codoping, but it decreases when the Cu concentration is further increased to 0.3 at %. The RL spectra were normalized for a better comparison of the emission contributions from Ce1 and Ce2. See FIG. 4B. There is a reduction of emission contribution from Ce2, consistent with the PL emission results.

The PL decay curves of non-codoped, 0.1 at %, and 0.3 at % $Cu^{2+}$ codoped LSO:Ce can be well fitted by a single exponential function. See FIGS. 5A and 5B. The decay constants of both Ce1 and Ce2 emissions decrease with increased $Cu^{2+}$ codoping concentration. For the Ce1 emission, the decay time decreases from 35.0 ns for non-codoped, 34.0 ns for 0.1 at % Cu, to 29.6 ns for 0.3 at % Cu. See FIG. 5A. For the Ce2 emission, it decreases from 46.4 ns for non-codoped, 44.7 ns for 0.1 at % Cu, to 31.7 ns for 0.3 at % Cu. See FIG. 5B. Also, the background value relative to the decay amplitude increases noticeably in highly codoped samples. For LSO and LYSO, the luminescence quenching of $Ce^{3+}$ at high temperature is caused by the thermal ionization process from the $Ce^{3+}$ $5d_1$ state to the conduction band (CB). See Kolk et al., Appl. Phys. Lett. 2003, 83, 1740-1742; and Fenq et al., J. Appl. Phys. 2010, 108, 033519 1-6. The ionization process can promote an electron into the CB and leave a temporary $Ce^{4+}$ behind. The electron left in the CB can recombine with the other temporary $Ce^{4+}$ centers, and then result in a delayed emission. The delayed emission spreading into much longer time scales than the time delay between two subsequent optical excitation pulses can cause the background signal to rise. The shortening of decay times of both Ce1 and Ce2 emissions also implies an increased probability of non-radiative recombination through the ionization process.

Scintillation Properties: A Simultaneous Improvement of Light Yield, Energy Resolution, and Scintillation Decay Time:

Pulse height spectra of 5 $mm^3$ non-codoped and $Cu^{2+}$ codoped LSO:Ce samples acquired by a Hamamatsu R2059 PMT under $^{137}Cs$ gamma-ray source irradiation are plotted in FIG. 6. The absolute light yield was evaluated by using the single photoelectron method (see Moszynski et al., IEEE Trans. Nucl. Sci. 1997, 44, 1052-1061) and the emission-weighted quantum efficiency of the PMT estimated for each sample. The light yield of the non-codoped LSO:Ce sample is 32,000 photons/MeV. The light yield can be enhanced to about 39,000 photons/MeV with 0.1 at % $Cu^{2+}$ codoping. This result is comparable to the values achieved by $Ca^{2+}$ (see Spurrier et al., IEEE Trans. Nucl. Sci. 2008, 55, 1178-1182) and $Li^+$ (see Wu et al., Phys. Status Solidi RRL2019, 13, 1800472 1-5) codoping. As the $Cu^{2+}$ codoping concentration is further increased to 0.3 at %, the light yield drops to 18,000 photons/MeV. The pulse height spectra acquired for energy resolution evaluation are shown in FIG. 7. The energy resolution ($\Delta E/E$) is calculated as the full width at half maximum of a photopeak divided by the location of the peak centroid. The energy resolution at 662 keV slightly improves from 10% for non-codoped to 9% for the 0.1 at % $Cu^{2+}$ codoped sample.

The scintillation decay curves of non-codoped, 0.1, and 0.3 at % $Cu^{2+}$ codoped LSO:Ce samples are presented in FIG. 8. All curves can be well fit by a single exponential function. The scintillation decay time shows a monotonically decreasing trend with the increase in $Cu^{2+}$ concentration, from 45.5 ns for non-codoped, 43.2 ns for 0.1 at % $Cu^{2+}$, to 34.0 ns for the 0.3 at % $Cu^{2+}$ codoped sample.

Without being bound to any one theory, such a scintillation decay time shortening with codoping can be explained in an similar way as has been done in Li$^+$ codoped LSO:Ce (see Wu et al., ACS Appl. Mater. Interface 2019, 11, 8194-8201), but is different from the Ce$^{4+}$-involved mechanism for Ca$^{2+}$ or Mg$^{2+}$ codoped LSO:Ce. See Blahuta et al., IEEE Trans. Nucl. Sci. 2013, 60(4), 3134-3141. Specifically, it is believed that the shortening of scintillation decay time in Cu$^{2+}$ codoped LSO:Ce originates from the reduced PL decay time of Ce1 and Ce2 due to an enhanced thermal ionization from the Ce$^{3+}$ 5d$_1$ state, and the suppression of the slow Ce2 emission.

Defect Structure: Thermoluminescence and Afterglow Analysis:

Because of the valence state mismatch between Cu$^{2+}$ codopants and Lu$^{3+}$ and Si$^{4+}$ host cations, and the non-conversion of stable Ce$^{3+}$ to Ce$^{4+}$, the defect structure of LSO:Ce has to be altered by Cu$^{2+}$ codoping in order to achieve electrical neutrality in the lattice. TL as an effective tool to detect the trap states was utilized to study the effect of Cu$^{2+}$ codoping on defect structure. The TL glow curves of non-codoped and Cu$^{2+}$ codoped LSO:Ce are shown in FIG. 9A. For non-codoped LSO:Ce, the dominant TL peaks at 346, 404, 451, and 510 K are associated with the oxygen vacancies (Vo) that are the nearest neighbors to the Ce center. See Vedda et al., Phys. Rev. B 2008, 78, 195123 1-8. These TL emissions have been attributed to the radiative recombination of electrons stored in Vo with holes localized at Ce$^{3+}$ through a thermally assisted tunneling mechanism. See Vedda et al., Phys. Rev. B 2008, 78, 195123 1-8. A drastic decrease of the TL peak at 346 K is observed in 0.1 at % Cu$^{2+}$ codoped sample. For the 0.3 at % Cu$^{2+}$ codoped sample, although the TL peaks at 346 and 404 K are completely reduced, two new TL peaks at 288 and 480 K appear with high emission signals.

Further discussion is based on a quantitative analysis of TL peaks and a comparison with the results of Ca$^{2+}$ and Li$^+$ codoping. The modified general-order kinetics expression describing TL intensity I as a function of temperature T (see Fenq et al., J. Appl. Phys. 2008, 103, 083109 1-7) is utilized to fit the glow curve:

$$I(T) = sn_0 \exp\left(-\frac{E_t}{\kappa_B T}\right) \times$$
$$\left\{\frac{(l-1)s}{\beta} \times T \times \exp\left(-\frac{E_t}{\kappa_B T}\right) \times \left[\left(\frac{\kappa_B T}{E_t}\right) - 2\left(\frac{\kappa_B T}{E_t}\right)^2 + 6\left(\frac{\kappa_B T}{E_t}\right)^3\right] + 1\right\}^{l/(1-l)}$$

where n$_0$ is the concentration of trapped charges at t=0, E$_t$ the energy level of the trap, κ$_B$ the Boltzmann constant, I the kinetic order, s the frequency factor, and β the heating rate (3 K/min in this measurement). The TL parameters of LSO:Ce evaluated from the partial cleaning and initial rise method (previously published in Vedda et al., Phys. Rev. B 2008, 78, 195123 1-8) were used as initial fitting parameters. As seen in FIG. 9B, the fitting curves agree well with the experimental ones. The results of peak temperature, trap depth, and frequency are listed in Table 1, below. The derived trap depth and frequency confirm the suppression of Vo (and/or dissociation of Ce and Vo) by Cu$^{2+}$ codoping, and the introduction of new deep traps in highly codoped samples.

TABLE 1

TL fitting parameter of non-codoped, 0.1 at %, and 0.3 at % Cu$^{2+}$ codoped LSO:Ce single crystals.

| Composition | Peak temperature (K) | Trap depth (eV) | Frequency (s$^{-1}$) | De-trapping time (s) |
|---|---|---|---|---|
| LSO:Ce | 346 | 0.99 | 4.0 × 10$^{12}$ | 1.5 × 10$^2$ |
|  | 404 | 0.99 | 2.5 × 10$^{10}$ | 2.4 × 10$^4$ |
|  | 451 | 0.99 | 1.0 × 10$^9$ | 6.1 × 10$^5$ |
|  | 510 | 0.99 | 4.0 × 10$^7$ | 1.5 × 10$^7$ |
| LSO:Ce, 0.1 at % Cu | 427 | 1.16 | 5.9 × 10$^{11}$ | 2.2 × 10$^9$ |
|  | 497 | 1.09 | 9.0 × 10$^8$ | 5.2 × 10$^7$ |
| LSO:Ce, 0.3 at % Cu | 288 | 0.61 | 7.0 × 10$^8$ | 2.5 × 10$^1$ |
|  | 480 | 2.00 | 1.7 × 10$^{19}$ | 2.4 × 10$^{14}$ |

On a basis of optical properties mentioned above, Cu$^{2+}$ and Li$^+$ codoping was found to have the same effect on Ce valence state and the luminescence properties of Ce1 and Ce2 center, but both are different from Ca$^{2+}$ codoping. Without being bound to any one theory, the similarity between Li$^+$ and Cu$^{2+}$ codoping can be ascribed to their close ionic radii, for example, under 6-coordination, the ionic radii of Li$^+$ and Cu$^{2+}$ are 76 and 73 picometers (pm), respectively, much smaller than that of Ca (i.e., 100 pm). See Shannon, Acta Cryst. 1976, A32, 751-767. Ca$^{2+}$ with a larger ionic radius is supposed to occupy the seven-coordinated Lu$^{3+}$ site and induce the stable Ce$^{4+}$ ions. See Wu et al., J. Cryst. Growth 2018, 498, 362-371. In contrast, Li$^+$ ions are prone to occupy not only seven-coordinated Lu$^{3+}$ substitution sites but also the six-coordinated interstitial spaces. See Wu et al., ACS Appl. Mater. Interface 2019, 11, 8194-8201; and Jia et al., Matt. Lett., 2018, 228, 372-374. The electrical neutrality of the system can be achieved by self-compensation between Li$_i$ and Li$_{Lu}$, and the variation in type and concentration of Vo, rather than by the conversion of Ce valence states. See Wu et al., ACS Appl. Mater. Interface 2019, 11, 8194-8201. Thus, it is reasonable to believe that Cu$^{2+}$ ions also tend to occupy the Lu$^{3+}$ substitutional site and the interstitial space. Moreover, the ratio between Cu$_{Lu}$ and Cu$_i$ should depend on the Cu$^{2+}$ codoping concentration, analogous to that of Li$^+$ codoping. See Wu et al., ACS Appl. Mater. Interface 2019, 11, 8194-8201. Specifically, the Cu$_i$ should be dominant in the lightly codoped sample, and the Cu$_{Lu}$ is dominant in highly codoped sample. This deduction can explain the TL variation induced by Cu$^{2+}$ codoping: i) the dominant and positively charged Cu$_i$ in the lightly codoped sample (0.1 at % Cu) can suppress/diminish the formation of Vo, which leads to a drastic reduction of the TL peak at 346 K (see FIG. 9A); ii) the dominant Cu$_{Lu}$ in the highly codoped sample can couple with Vo to form {Cu$_{Lu}$+Vo} complex defects due to the Coulomb attraction. The formation of complex defects can dissociate the spatially-correlated Ce and Vo and result in a suppression of the four Vo-associated TL peaks (see FIG. 9A), similar to the effect of {Ca$_{Lu}$+Vo} complex as suggested in Ca$^{2+}$ codoped LSO. See Wu et al., J. Cryst. Growth 2018, 498, 362-371. However, there is a difference between Cu$^{2+}$ codoping and both Li$^+$ and Ca$^{2+}$ codoping in that the newly formed defects themselves, such as Cu$_{Lu}$ and {Cu$_{Lu}$+Vo}, can serve as new electron traps with an energetically depth of 0.6 and 2.0 eV. $^{63}$Cu nuclear magnetic resonant (NMR) experiments and density functional theory (DFT) calculations could be used to clarify the preferential site occupation of Cu$^{2+}$ ions in LSO and its role on defect structure alternation.

Based on the fitted trap parameters, the de-trapping time $\tau$ at room temperature (RT) was calculated by using the following equation:

$$\tau = s^{-1} \times e^{E/kT}$$

See Vedda et al., Phys. Rev. B 2009, 80, 045113 1-9. The calculated de-trapping times at RT are listed in Table 1, above. Since there is a correlation between deep traps and RT afterglow, the room temperature afterglow profiles of non-codoped and $Cu^{2+}$ codoped LSO:Ce samples were measured. See FIG. 10. A reciprocal correlation between scintillation light yield and afterglow is found. In the case of the 0.1 at % $Cu^{2+}$ codoped sample with improved light yield, afterglow drops by 50% compared to that of the non-codoped sample due to the removal of a Vo-associated TL peak at 346 K. Because of the formation of deep traps associated with a TL peak at 288 K, the afterglow level of the 0.3 at % $Cu^{2+}$ codoped sample is one order of magnitude higher than that of non-codoped LSO:Ce. As seen in the inset of FIG. 10, the as-grown boule codoped 0.3 at % $Cu^{2+}$ has a bright blue emission under UV excitation, and the afterglow emission is still visible after turning off the UV excitation for one minute.

Summary:

High quality 32 mm diameter and 110 mm long LSO:Ce single crystals codoped with 0.1 and 0.3 at % $Cu^{2+}$ ions were successfully grown by the Czcoralski method. The surface tension of the melt was not reduced enough by $Cu^{2+}$ codoping to affect the crystal growth stability. Unlike the partial conversion of Ce ions from trivalent to tetravalent by $Ca^{2+}$ codoping, $Cu^{2+}$ codoping does not introduce stable $Ce^{4+}$ into the LSO lattice. The emission contribution from Ce2 centers gradually reduces as the $Cu^{2+}$ codoping concentration increases. Despite the fact that $Cu^{2+}$ induces an enhanced thermal ionization effect from the $Ce^{3+}$ $5d_1$ state, the scintillation yield of LSO:Ce is still improved from 32,000 to 39,000 photons/MeV by suppression of Vo defects. Without being bound by any one theory, the shortening of scintillation decay times is regarded as a result of both the enhanced thermal ionization effect from $Ce^{3+}$ $5d_1$ state and the reduction of the slow Ce2 emission. The similarity in codoping behaviors between $Li^+$ and $Cu^{2+}$ in LSO:Ce, and the dissimilarity to codoping behaviors of $Ca^{2+}$ suggest that the empirical selection criteria of suitable codopants for performance enhancement in oxide scintillators are not only the valence state of codopant but, also, their ionic radius.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A scintillator material comprising lutetium oxyorthosilicate (LSO) doped with 0.1 atomic % cerium (Ce) and codoped with 0.1 atomic % copper (Cu).

2. The scintillator material of claim 1, wherein said material is a single crystal, polycrystalline, or a ceramic material.

3. A radiation detector comprising the scintillator material of claim 1.

4. The radiation detector of claim 3, wherein the detector is a medical diagnostic device, a device for oil exploration, and/or a device for container, vehicle, human, animal, or baggage scanning.

5. The radiation detector of claim 3, wherein the medical diagnostic device is a positron emission tomography (PET) device, a single photon emission computed tomography (SPECT) device or a planar nuclear medical imaging device.

6. A method of detecting gamma rays, X-rays, cosmic rays, and particles having an energy of 1 keV or greater, the method comprising using the radiation detector of claim 3.

7. A method of altering one or more scintillation and/or optical properties of a lutetium oxyorthosilicate (LSO) scintillator, the method comprising preparing the scintillator in the presence of a Ce dopant ion and a codopant ion, wherein the codopant ion is a Cu ion present at about 100 ppm with respect to all cations, and wherein preparing the scintillator in the presence of the Ce dopant ion and the codopant ion provides a scintillator with increased scintillation light yield, decreased scintillation decay time, decreased afterglow, and increased energy resolution as compared to a scintillator prepared in the presence of the dopant ion and in the absence of the codopant ion.

* * * * *